(12) United States Patent
Suo et al.

(10) Patent No.: US 8,472,465 B2
(45) Date of Patent: Jun. 25, 2013

(54) METHOD AND AN APPARATUS FOR DETERMINING THE RADIO FRAME STRUCTURE OF TIME DIVISION DUPLEX SYSTEM

(75) Inventors: Shiqiang Suo, Beijing (CN); Xueming Pan, Beijing (CN); Shaohui Sun, Beijing (CN); Yingmin Wang, Beijing (CN); Yongbin Xie, Beijing (CN); Ke Wang, Beijing (CN); Hai Tang, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 483 days.

(21) Appl. No.: 12/740,972

(22) PCT Filed: Nov. 3, 2008

(86) PCT No.: PCT/CN2008/001840
§ 371 (c)(1),
(2), (4) Date: May 12, 2010

(87) PCT Pub. No.: WO2009/070964
PCT Pub. Date: Jun. 11, 2009

(65) Prior Publication Data
US 2010/0246456 A1    Sep. 30, 2010

(30) Foreign Application Priority Data

Nov. 2, 2007    (CN) .......................... 2007 1 0176799
Nov. 8, 2007    (CN) .......................... 2007 1 0177030
Nov. 9, 2007    (CN) .......................... 2007 1 0177132

(51) Int. Cl.
    *H04B 7/212*    (2006.01)
(52) U.S. Cl.
    USPC ........................................................ 370/442

(58) Field of Classification Search
    USPC .................................. 370/310–350, 431–460
    See application file for complete search history.

(56) References Cited

U.S. PATENT DOCUMENTS

| 2004/0190541 A1* | 9/2004 | Zhang .......................... 370/431 |
| 2007/0147333 A1 | 6/2007 | Makhijani |
| 2008/0095195 A1* | 4/2008 | Ahmadi et al. ............... 370/478 |

FOREIGN PATENT DOCUMENTS

| CN | 1547414 | 11/2004 |
| CN | 1913418 | 2/2007 |

(Continued)

OTHER PUBLICATIONS

Hyung G. Myung, "Technical Overview of 3GPP LTE", Feb. 8, 2007.*

(Continued)

*Primary Examiner* — Jeffrey M Rutkowski
*Assistant Examiner* — Juvena Loo
(74) *Attorney, Agent, or Firm* — Barnes & Thornburg LLP

(57) ABSTRACT

A method for determining the radio frame structure of a Time Division Duplex system is disclosed, which comprises: configuring, by the network side, the radio frame structure used for service transmission as containing two half-frames each of 5 ms, wherein each half-frame consists of eight service time slots of 0.5 ms and one special time slot field of 1 ms, two consecutive service time slots form a subframe of which the length is 1 ms, and the special time slot field contains a DwPTS, a GP and an UpPTS; determining the lengths of the DwPTS, the GP and the UpPTS in the special time slot field according to the requirements of the coverage range, and determining the radio frame structure used for service transmission. By reconfiguring the radio frame structure, the invention can flexibly support different coverage ranges, enhance the flexibility of satisfying different service requirements, and implement the coexistence of two types of TDD systems.

14 Claims, 10 Drawing Sheets

FOREIGN PATENT DOCUMENTS

| | | |
|---|---|---|
| CN | 101005305 | 7/2007 |
| CN | 101159479 | 4/2008 |
| CN | 101179328 | 5/2008 |
| KR | 2002-0052561 | 7/2002 |

OTHER PUBLICATIONS

CMCC, CATT, etc. Special Subframe Design for Optimized TDD Type 2, TSG-RAN WG1 #51, Nov. 6, 2007, pp. 1-2 see section 2.

CMCC, CATT, etc., Way Forward on LTE TDD Frame Structure, TSG-RAN WG1 #51, Nov. 1, 2007, pp. 1-2 see p. 1 section 2 lines 1-5, p. 2, Figure 1.

International Search Report for PCT/CN2008/001840 dated Jan. 15, 2009.

* cited by examiner

METHOD AND AN APPARATUS FOR DETERMINING THE RADIO FRAME STRUCTURE OF TIME DIVISION DUPLEX SYSTEM

CROSS-REFERENCE TO RELATED APPLICATIONS

The present application claims the benefit of priority to International Patent Application No. PCT/CN2008/001840 filed 3 Nov. 2008, which further claims the benefits of priorities to Chinese patent Applications No. 200710176799.X filed 2 Nov. 2007, No. 200710177030.X filed 8 Nov. 2007 and No. 200710177132.1 filed 9 Nov. 2007, the contents of which are incorporated herein by reference in their entirety.

FIELD OF THE INVENTION

The present invention relates to the field of mobile communication technologies, and in particular to a method and an apparatus for determining a radio frame structure of a Time Division Duplex (TDD) system.

BACKGROUND OF THE INVENTION

At present, the 3rd Generation Partnership Project (3GPP) has started up a study project of Long Term Evolution (LTE) of 3G radio interface technology. With the progression of the study, it is determined that the LTE system supports the following 2 types of radio frame structures.

A) The first type of radio frame (Type1 for short below), which is applicable to a Frequency Division Duplex (FDD) system and a TDD system, and the structure of which is as shown in FIG. 1.

As shown in FIG. 1, the frame length of Type1 is 10 ms, and the radio frame consists of 20 time slots, where the length of each time slot is 0.5 ms, and the time slots are labeled as #0~#19 in FIG. 1. Each two consecutive time slots are defined as a subframe, and there are totally 10 subframes, i.e., Subframe i consists of Time slots #2i and #2i+1, where i=0, 1, 2, . . . , 9.

When Type1 is applied to an FDD system, because the uplink and downlink of the FDD system are separated on the frequency domain, there are 10 subframes available for both the uplink and the downlink in each period of 10 ms.

When Type1 is applied to a TDD system, there are totally 10 subframes available for the uplink and the downlink in each period of 10 ms, and each subframe is used for uplink transmission or for downlink transmission, where Subframe 0 and Subframe 5 are always allocated for downlink transmission.

The LTE system is based on the Orthogonal Frequency Division Multiplexing (OFDM) technology, the subcarrier interval is set as 15 KHz, and the corresponding OFDM symbol length is 66.67 μs; for Type1, the length of each time slot is 0.5 ms, and when a small coverage range is supported, a short cycle prefix (CP) with a length of 4.7 μs is used, and each time slot contains 7 OFDM symbols; and when a large coverage range is supported, a long CP with a length of 16.67 μs is used, and each time slot contains 6 OFDM symbols. It may be known by calculation that the CP overheads of Type1 in short CP configuration and long CP configuration are about 6.7% and 20%, respectively.

B) The second type of radio frame (Type2 for short below), which is applicable to a TDD system, and the structure of which is as shown in FIG. 2.

As shown in FIG. 2, the frame length of Type2 is 10 ms, and each frame is divided into 2 half-frames each of 5 ms. Each half-frame consists of 7 service time slots (labeled as #0~#6 in FIG. 2) and 3 special time slots. As shown in FIG. 2, the 3 special time slots are Downlink Pilot Time Slot (DwPTS), Guard Period (GP) and Uplink Pilot Time Slot (UpPTS), respectively.

Each service time slot is defined as a subframe, where Subframe #0 and DwPTS are always used for downlink transmission, while Subframe #1 and UpPTS are always used for uplink transmission.

In the frame structure of Type2, the length of each service time slot is 675 μs, and when short CP configuration is employed, each service time slot consists of 9 OFDM symbols with short CP configuration, where the length of the short CP is 8.33 μs, and the length of the OFDM symbol is 66.67 μs. When long CP configuration is employed, each service time slot consists of 8 OFDM symbols with long CP configuration, where the length of the long CP is 17.71 μs, and the length of the OFDM symbol is still 66.67 μs. Specifically, it is determined by the specific requirements of the application scenario whether short CP configuration or long CP configuration is employed, for example, when a small coverage range is supported, short CP configuration is employed; when a large coverage range is supported or when a multi-cell broadcast service is carried out, long CP configuration is employed.

It can be seen from the frame structures of Type1 and Type2 that, because the frame structures are different, the CP overhead in Type2, especially in the case of short CP configuration, is relatively large, which reaches 8.33/66.67=12.49%. In an OFDM system, the CP length determines the anti-multipath capacity of the OFDM system, so a long CP is favorable to overcome multipath interference, but the system overhead may be large, and the relatively large overhead may affect the peak rate and the transmission efficiency of the system, thereby lowering the data transmission capacity. For the channel environment in a practical application, a CP of about 5 μs can meet the requirements to overcome the affect caused by multipath delay spread. Therefore, the existing CP length in Type2 may decrease the transmission efficiency.

For a TDD system, in order to avoid the interference between the uplink and downlink time slots, a GP needs to be set at the switch point from the downlink time slot to the uplink time slot, and the length of the GP equals to the time for an electromagnetic wave to propagate a distance that is twice of the cell radius, i.e., $T_{GP}=2*R_{cell}/C$, where $R_{cell}$ represents the cell radius, C represents the propagation velocity of the electromagnetic wave in vacuum ($3\times10^8$ m/s).

In the prior art, the lengths of the three special time slots, DwPTS, GP and UpPTS, in the special time slot area in Type2 are fixed, as 83.33 μs, 50 μs and 141.67 μs respectively, where it may be known from the above calculation formula of $T_{GP}$ that the coverage radius supported by the system under such a frame structure configuration is determined by the length of the GP.

Currently, methods for adjusting the GP for different coverage ranges includes:

A) For a cell radius less than 7.5 km, the existing frame structure is used, as shown in FIG. 3, the GP length is 50 μs, and random access is carried out in the UpPTS.

B) For a medium coverage range with a cell radius larger than 7.5 km and less than 30 km, the frame structure as shown in FIG. 4 is used, and the inherent GP length of 50 μs in Type2 is insufficient, thus the GP and the UpPTS are combined to a new GP, the length of the new GP is 191.66 μs, and it may be calculated according to the relationship between $T_{GP}$ and $R_{cell}$ that this frame structure can support a coverage range of about 29 km. At this point, random access may be carried out in Subframe #1 or any uplink time slot thereafter;

C) For a large coverage range with a cell radius larger than 30 km, the frame structure as shown in FIG. 5 is used, and at this point, the whole Subframe #1 and GP, UpPTS are combined to a new GP, the length of the new GP is 866.66 µs, and a cell coverage range over 100 km can be supported. At this point, random access is carried out in Subframe #2 or any uplink time slot thereafter.

It can be seen from the above description that, in order to support a larger coverage range of a cell, a method for lengthening a GP to contain one or more uplink time slots is employed in the prior art. However, the above configuration method is not flexible enough for supporting the coverage range; for example, for a cell with a coverage range of 40 km, Solution C is needed for its frame structure, while at most a coverage range of 120 km can be supported by Solution C, thus a great part of the GP may be wasted in the practical application, thereby decreasing the transmission efficiency of the system.

Therefore, various requirements of the coverage range cannot be flexibly supported in the prior art.

SUMMARY OF THE INVENTION

One object of the invention is to provide a method for determining a radio frame structure and a transmission apparatus of a TDD system, thereby flexibly supporting various requirements of the coverage range.

Another object of the invention is to provide a method and an apparatus for allocating subframes of a TDD system, thereby decreasing the adjustment granularity of time slot ratio in a TDD system and enhancing the flexibility of satisfying different service requirements.

Still another object of the invention is to provide a method and an apparatus for the coexistence of TDD systems, thereby implementing the coexistence of the first TDD system and the second TDD system.

To attain the above objects, the technical solutions of the invention are as follows.

A method for determining a radio frame structure of a TDD system, including:

configuring, by the network side, the radio frame structure used for service transmission as containing 2 half-frames each of 5 ms, wherein each half-frame consists of 8 service time slots each of 0.5 ms and 1 special time slot field of 1 ms, two consecutive service time slots form a subframe of which the length is 1 ms, and the special time slot field contains a DwPTS, a GP and an UpPTS; and determining lengths of the DwPTS, the GP and the UpPTS in the special time slot field according to requirements of a coverage range to determine the radio frame structure used for the service transmission.

A transmission apparatus of a TDD system, including:

a network side frame structure configuration module, a frame structure notification module and a service transmitting and receiving module that are set on the network side; and a terminal frame structure configuration module, a frame structure notification receiving module and a terminal service transmitting and receiving module that are set on the terminal side;

the network side frame structure configuration module is adapted to store preset information of a frame structure, determine lengths of a DwPTS, a GP and an UpPTS in a special time slot field according to the preset information and requirements of the system on a coverage range, determine radio frame structure information used for service transmission, and transmit the frame structure information to the frame structure notification module and the service transmitting and receiving module;

wherein the preset information includes: configuring the radio frame structure used by the system for service transmission as containing 2 half-frames each of 5 ms, wherein each half-frame consists of 8 service time slots each of 0.5 ms and 1 special time slot field of 1 ms, two consecutive service time slots form a subframe of which the length is 1 ms, and the special time slot field contains a DwPTS, a GP and an UpPTS;

the frame structure notification module is adapted to notify the frame structure notification receiving module on the terminal side of the frame structure information containing the lengths of the DwPTS, the GP and the UpPTS in the special time slot field configured;

the frame structure notification receiving module on the terminal side is adapted to receive the frame structure information transmitted by the frame structure notification module, and transmit the frame structure information to the terminal frame structure configuration module;

the terminal frame structure configuration module is adapted to store preset information of a frame structure, which is the same as that stored in the network side frame structure configuration module, configure the frame structure of the terminal side according to the preset information and the frame structure information transmitted by the frame structure notification receiving module, and transmit the frame structure information it configures to the terminal service transmitting and receiving module; and the service transmitting and receiving module set on the network side and the terminal service transmitting and receiving module set on the terminal side use the frame structure configured for service transmission.

It can be seen from the above technical solutions that in the invention, by reconfiguring the frame structure, flexible configuration may be implemented on the DwPTS, GP or UpPTS contained in the special time slot field according to the requirements of the system on the coverage range, thereby implementing the flexible support for different coverage ranges.

A method for allocating subframes of a TDD system, including:

determining a configuration ratio of uplink service subframe to downlink service subframe when at least one radio frame is taken as a subframe allocation period according to a ratio of uplink traffic to downlink traffic, wherein the radio frame structure includes 2 half-frames each of 5 ms, each half-frame consists of 8 service time slots each of 0.5 ms and 1 special time slot field of 1 ms, and two consecutive service time slots form a subframe of which the length is 1 ms; and determining an allocation mode of uplink service subframes and downlink service subframes in the at least one radio frame according to the configuration ratio of uplink service subframe to downlink service subframe.

One embodiment of the invention provides a subframe allocation apparatus of a TDD system, including:

a configuration ratio determination unit, adapted to determine a configuration ratio of uplink service subframe to downlink service subframe when at least one radio frame is taken as a subframe allocation period according to a ratio of uplink traffic to downlink traffic, wherein the radio frame structure includes 2 half-frames each of 5 ms, each half-frame consists of 8 service time slots each of 0.5 ms and 1 special time slot field of 1 ms, and two consecutive service time slots form a subframe of which the length is 1 ms; and a first allocation mode determination unit, adapted to determine an allocation mode of uplink service subframes and downlink service subframes in the at least one radio frame according to the configuration ratio of uplink service subframe to downlink service subframe.

A base station, including:

a configuration ratio determination unit, adapted to determine a configuration ratio of uplink service subframe to downlink service subframe when at least one radio frame is taken as a subframe allocation period according to a ratio of uplink traffic to downlink traffic, wherein the radio frame structure includes 2 half-frames each of 5 ms, each half-frame consists of 8 service time slots each of 0.5 ms and 1 special time slot field of 1 ms, and two consecutive service time slots form a subframe of which the length is 1 ms; and a first allocation mode determination unit, adapted to determine an allocation mode of uplink service subframes and downlink service subframes in the at least one radio frame according to the configuration ratio of uplink service subframe to downlink service subframe.

A method for allocating subframes of a TDD system, including:

receiving indication information of an allocation mode of uplink service subframes and downlink service subframes in at least one radio frame when said at least one radio frame is taken as a subframe allocation period, wherein the radio frame structure includes 2 half-frames each of 5 ms, each half-frame consists of 8 service time slots each of 0.5 ms and 1 special time slot field of 1 ms, and two consecutive service time slots form a subframe of which the length is 1 ms;

determining the allocation mode of uplink service subframes and downlink service subframes in said at least one radio frame according to the indication information; and determining the uplink service subframes and the downlink service subframes in said at least one radio frame according to the allocation mode.

A subframe allocation apparatus of a TDD system, including:

an indication information receiving unit, adapted to receive indication information of an allocation mode of uplink service subframes and downlink service subframes in at least one radio frame when said at least one radio frame is taken as a subframe allocation period, wherein the radio frame structure includes 2 half-frames each of 5 ms, each half-frame consists of 8 service time slots each of 0.5 ms and 1 special time slot field of 1 ms, and two consecutive service time slots form a subframe of which the length is 1 ms;

a second allocation mode determination unit, adapted to determine the allocation mode of uplink service subframes and downlink service subframes in said at least one radio frame according to the indication information; and a subframe allocation unit, adapted to determine the uplink service subframes and the downlink service subframes in said at least one radio frame according to the allocation mode.

A user equipment, including:

an indication information receiving unit, adapted to receive indication information of an allocation mode of uplink service subframes and downlink service subframes in at least one radio frame when said at least one radio frame is taken as a subframe allocation period, wherein the radio frame structure includes 2 half-frames each of 5 ms, each half-frame consists of 8 service time slots each of 0.5 ms and 1 special time slot field of 1 ms, and two consecutive service time slots form a subframe of which the length is 1 ms;

a second allocation mode determination unit, adapted to determine the allocation mode of uplink service subframes and downlink service subframes in said at least one radio frame according to the indication information; and a subframe allocation unit, adapted to determine the uplink service subframes and the downlink service subframes in said at least one radio frame according to the allocation mode.

In the method and apparatus for allocating subframes of a TDD system according to the embodiments of the invention, it is determined to take at least one radio frame as the subframe allocation period, and the configuration ratio of uplink service subframe to downlink service subframe is enriched, so that the allocation mode of uplink service subframes and downlink service subframes can be selected according to the ratio of uplink traffic to downlink traffic, the adjustment granularity of service subframe ratio can be decreased, and the flexibility of satisfying different service requirements can be enhanced.

A method for the coexistence of TDD systems, including:

determining, according to time slot allocation ratio information of a radio frame in a second TDD system that coexists with a first TDD system, a configuration mode of subframes and special time slot fields of a radio frame in the first TDD system and a time offset of initiation time of the radio frame in the first TDD system relative to initiation time of the radio frame in the second TDD system when a switch-point of the radio frame in the first TDD system is aligned with a switch-point of the radio frame in the second TDD system by taking one radio frame as a configuration period; wherein, the radio frame structure in the first TDD system includes 2 half-frames each of 5 ms, each half-frame consists of 8 service time slots each of 0.5 ms and 1 special time slot field of 1 ms, and two consecutive service time slots foam a subframe of which the length is 1 ms; and configuring the uplink service subframes, downlink service subframes and special time slot fields of the radio frame in the first TDD system according to the configuration mode, and setting a time offset as the offset of the frame timing of the first TDD system relative to a reference time according to the frame timing of the second TDD system by taking the initiation time of the radio frame in the second TDD system as the reference time.

An apparatus for the coexistence of TDD systems, including:

a coexistence determination unit, adapted to determine, according to time slot allocation ratio information of a radio frame in a second TDD system that coexists with a first TDD system, a configuration mode of subframes and special time slot fields of a radio frame in the first TDD system and a time offset of initiation time of the radio frame in the first TDD system relative to initiation time of the radio frame in the second TDD system when a switch-point of the radio frame in the first TDD system is aligned with a switch-point of the radio frame in the second TDD system by taking one radio frame as a configuration period; wherein, the radio frame structure in the first TDD system includes 2 half-frames each of 5 ms, each half-frame consists of 8 service time slots each of 0.5 ms and 1 special time slot field of 1 ms, and two consecutive service time slots form a subframe of which the length is 1 ms; and a coexistence configuration unit, adapted to configure uplink service subframes, downlink service subframes and special time slot fields of the radio frame in the first TDD system according to the configuration mode, and set the time offset as the offset of the frame timing of the first TDD system relative to a reference time according to the frame timing of the second TDD system by taking the initiation time of the radio frame in the second TDD system as the reference time.

A base station, including:

a coexistence determination unit, adapted to determine, according to the time slot allocation ratio information of a radio frame in a second TDD system that coexists with a first TDD system, a configuration mode of subframes and special time slot fields of a radio frame in the first TDD system and a time offset of initiation time of the radio frame in the first TDD system relative to initiation time of the radio frame in the second TDD system when a switch-point of the radio frame in the first TDD system is aligned with a switch-point of the radio frame in the second TDD system by taking one radio frame as a configuration period; wherein, the radio frame structure in the first TDD system includes 2 half-frames each of 5 ms, each half-frame consists of 8 service time slots each of 0.5 ms and 1 special time slot field of 1 ms, and two consecutive service time slots form a subframe of which the length is 1 ms; and a coexistence configuration unit, adapted to configure uplink service subframes, downlink service subframes and special time slot fields of the radio frame in the first TDD system according to the configuration mode, and set the time offset as the offset of the frame timing of the first TDD system relative to a reference time according to the frame timing of the second TDD system by taking the initiation time of the radio frame in the second TDD system as the reference time.

In the method and apparatus for the coexistence of TDD systems according to the embodiments of the invention, it determines, according to the time slot allocation ratio information of a radio frame in the second TDD system by taking one radio frame as the configuration period, the configuration mode of radio frames in the first TDD system and the time offset of the initiation time of the radio frame relative to the initiation time of the radio frame in the second TDD system, configures the radio frames in the first TDD system according to the configuration mode, and determines the frame timing of the first TDD system according to the time offset and the frame timing of the second TDD system, thereby making the switch-point of the radio frame in the first TDD system align with the switch-point of the radio frame in the second TDD system, eliminating the superposition of uplink time slot and downlink time slot of radio frames in the first TDD system and the second TDD system, reducing the interference between systems greatly, and implementing the coexistence of the first TDD system and the second TDD system.

DETAILED DESCRIPTION OF THE EMBODIMENTS

The technical solutions of the invention will now be further illustrated in detail by specific embodiments in conjunction with the drawings.

Figure 1:
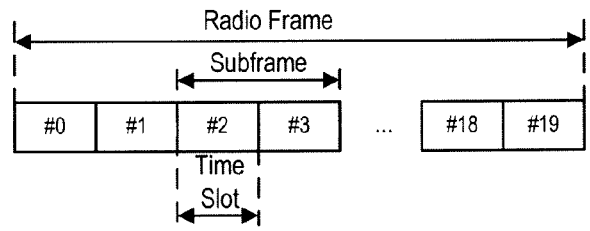
FIG. 1 is a schematic diagram of a frame structure Type1 in the prior art.
Figure 2:
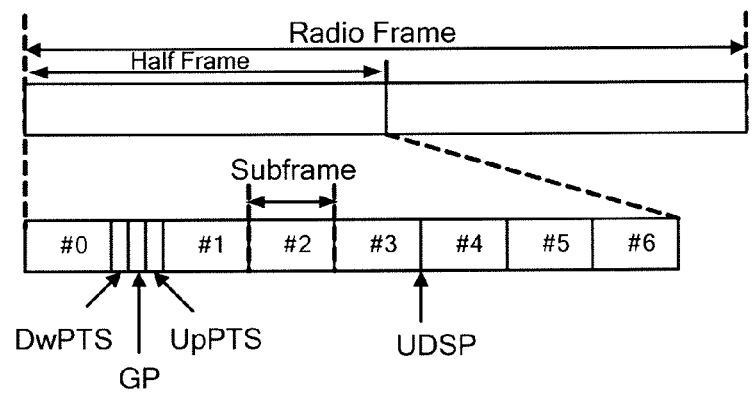
FIG. 2 is a schematic diagram of a frame structure Type2 in the prior art.
Figure 3:
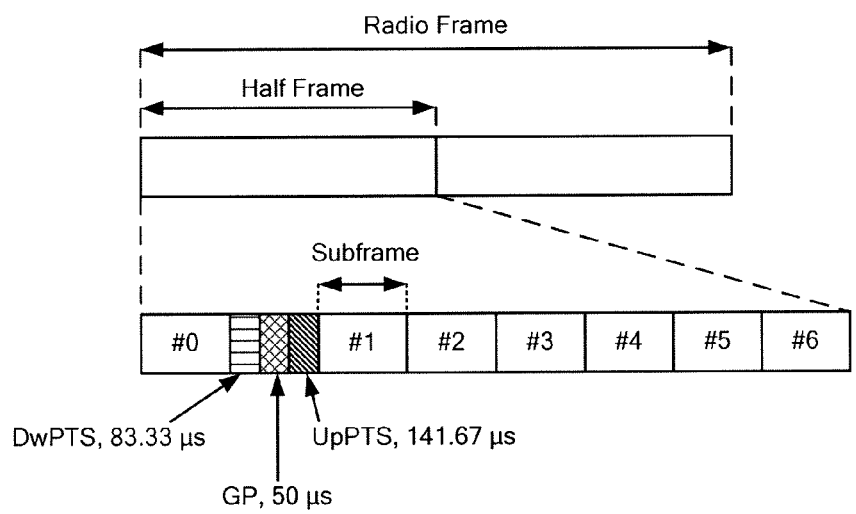
FIG. 3 is a schematic diagram of a frame structure of an LTE TDD system in the case of small coverage in the prior art.
Figure 4:
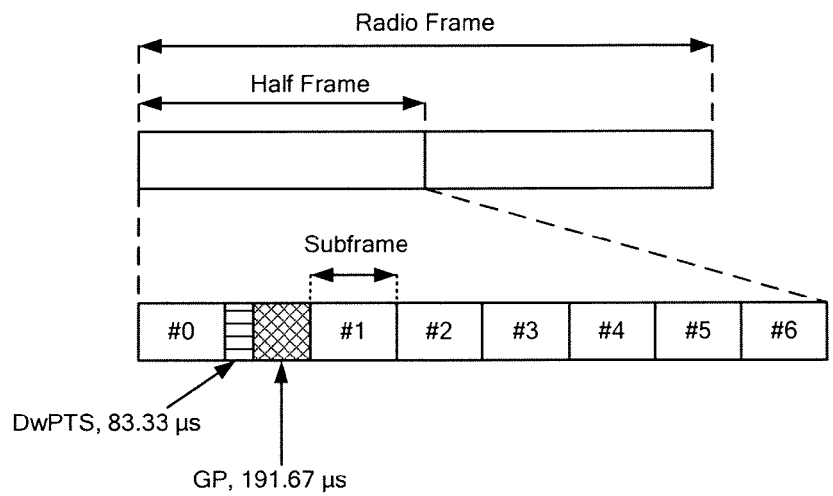
FIG. 4 is a schematic diagram of a frame structure of an LTE TDD system in the case of medium coverage in the prior art.
Figure 5:
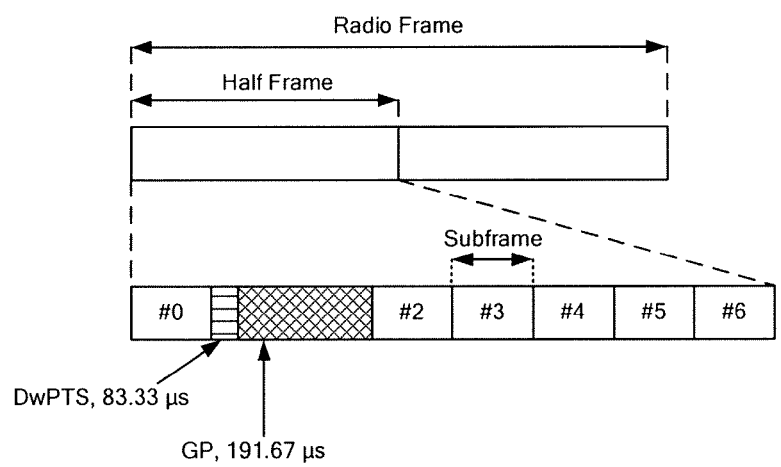
FIG. 5 is a schematic diagram of a frame structure of an LTE TDD system in the case of large coverage in the prior art.
Figure 6:
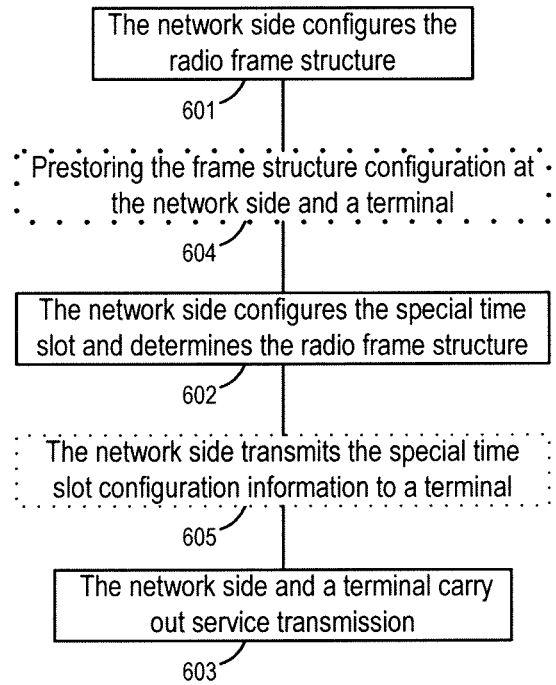
FIG. 6 is a schematic flow chart of a transmission method for a TDD system according to an embodiment of the invention.

The process of a transmission method for a TDD system according to an embodiment of the invention is as shown in FIG. 6, which includes:

Process 601: the network side configures a radio frame structure used for service transmission.

Figure 7:
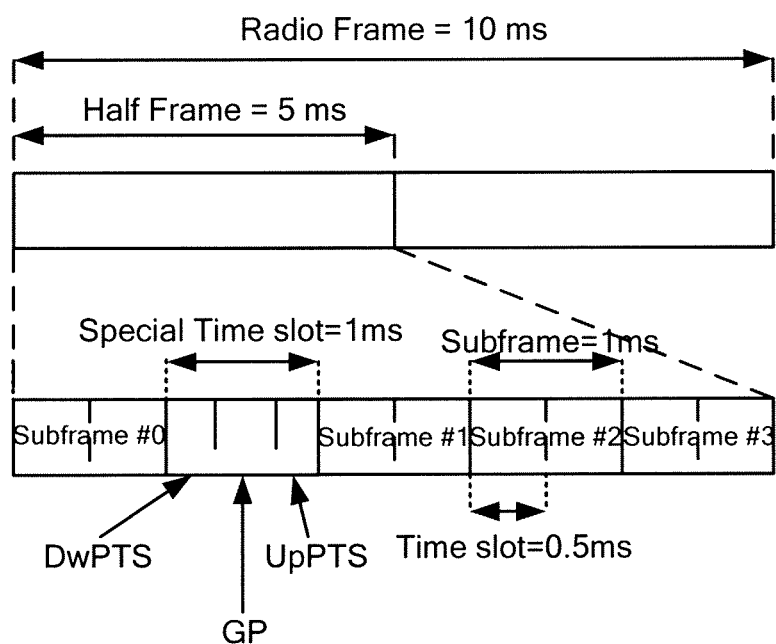
FIG. 7 is a schematic diagram of a frame structure configured in the transmission method according to an embodiment of the invention.

The radio frame structure is as follows: a radio frame of 10 ms contains 2 half-frames each of 5 ms, each half-frame consists of 8 service time slots each of 0.5 ms and 1 special time slot field of 1 ms, and two consecutive service time slots form a subframe of which the length is 1 ms, and the special time slot field contains 3 special time slots: DwPTS, GP and UpPTS, as shown in FIG. 7.

The lengths of the 3 special time slots may be configured flexibly via an upper-layer signaling, but the total length of the special time slot field consisting of the 3 special time slots is kept constant as 1 ms. Each half-frame contains 4 subframes, each service time slot is configured according to parameters shown in Table 1, where the parameters are the same as that used for Type1 of the FDD system in the prior art.

TABLE 1

| | Service time slot length | Number of symbols | CP length | |
|---|---|---|---|---|
| Short CP | 0.5 ms | 7 | The first symbol (5.21 μs) | The other 6 symbols (4.69 μs) |
| Long CP | | 6 | 16.67 μs | |

According to different configuration modes of a radio frame, it may be divided into the following two situations:

A) Taking a half-frame of 5 ms as an allocation period, the configuration modes of uplink and downlink time slots for each half-frame are the same as each other.

At this point, a pair of uplink-downlink switch-points, including a Downlink to Uplink Switch Point (DUSP) and an Uplink to Downlink Switch Point (UDSP), is configured for each half-frame. The DUSP lies in the GP, and the UDSP may be configured on the border between the special time slot field and Subframe #1, or on the border between Subframe #1 and Subframe #2, or on the border between Subframe #2 and Subframe #3, or on the other border of Subframe #3, which may be configured according to a ratio required by uplink and downlink transmissions, without being limited in the embodiments of the invention.

B) By taking a radio frame of 10 ms as an allocation period, the configuration modes of uplink and downlink time slots in two half-frames each of 5 ms of the radio frame are independent, and they may be the same or different; at this point, the radio frame configuration may be further divided into two situations:

b1) Two pairs of uplink-downlink switch-points are configured in one radio frame, that is, a pair of uplink-downlink switch-points (DUSP and UDSP) is configured for each half-frame of 5 ms, and at this point, the UDSP locations in the two half-frames are independent, without the need to keep as the same correspondingly;

b2) the special time slot field for one half-frame of 5 ms is set to contain a DwPTS, a GP and an UpPTS, and the special time slot field in the other half-frame of 5 ms is set to only contain a DwPTS; because a downlink synchronization channel is transmitted in the DwPTS, the transmission period of a downlink synchronization signal is 5 ms.

The DUSP is configured in the GP; when the half-frame containing a DwPTS, a GP and an UpPTS is in the front, the UDSP is configured on the border of any subframe behind the UpPTS and in front of the special time slot field of the next half-frame of 5 ms; when the half-frame containing a DwPTS, a GP and an UpPTS is in the back, the UDSP is configured on the border of any subframe behind the UpPTS.

Figure 8:
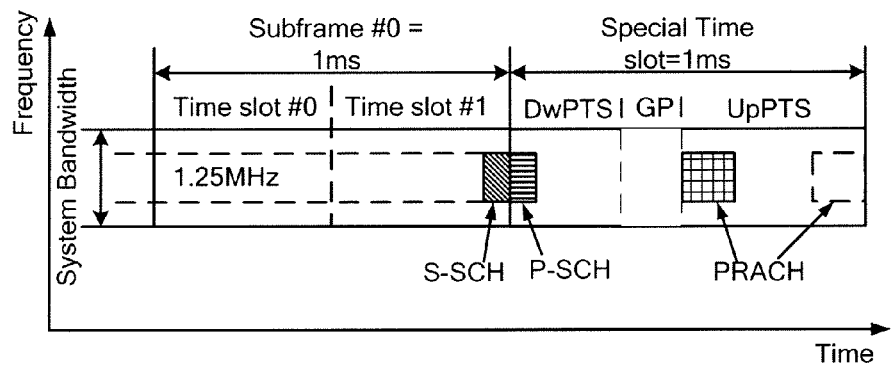
FIG. 8 is a schematic diagram of a structural composition of the special time slot according to an embodiment of the invention.

Process 602: the network side configures the length of each special time slot in the special time slot field according to different coverage range requirements; the specific methods are as follows:

1) FIG. 8 shows the specific structures of the DwPTS, GP and UpPTS in the special time slot field: the length of DwPTS is set to be one or more OFDM symbols, the DwPTS contains a primary synchronization channel P-SCH, and the P-SCH is transmitted over the first OFDM symbol of the DwPTS, the frequency domain occupied by the P-SCH is the intermediate 1.25 MHz bandwidth of the total frequency band of the system.

It should be noted that, when the system needs to coexist with a Time Division-Synchronous Code Division Multiple Access (TD-SCDMA) system, because the two systems are both TDD systems, when an overlap area exists between the network coverages of the two systems, mutual interference may appear because the uplink and downlink time slots in the frame structures used by the two systems are different, or even the two systems may be made unable to work normally.

Therefore, when the system does not need to coexist with a TD-SCDMA system, the DwPTS is configured in length to contain at least two OFDM symbols, the DwPTS contains a primary synchronization channel, and the primary synchronization channel is transmitted over the first OFDM symbol of the DwPTS.

However, when the system needs to coexist with a TD-SCDMA system, the DwPTS is configured in length to contain at least one OFDM symbol, the DwPTS contains a primary synchronization channel, and the primary synchronization channel is transmitted over the first OFDM symbol of the DwPTS.

The time and frequency domain resources in the DwPTS, except the time frequency resources occupied by the P-SCH, are used for transmitting at least one of downlink control signaling, downlink data and a downlink reference signal.

Secondary synchronization signal S-SCH is transmitted in the last OFDM symbol in Subframe #0, i.e., the OFDM symbol in front of the DwPTS, and the frequency domain occupied by the S-SCH is the same as that occupied by the P-SCH, and it is also the intermediate 1.25 MHz bandwidth of the total frequency band of the system.

It may be seen from the above Table 1 that, when short CP configuration is employed, the special time slot field of 1 ms contains 14 OFDM symbols, and when long CP configuration is employed, the special time slot field of 1 ms contains 12 OFDM symbols.

At this point, the length of the GP is set as N OFDM symbols according to the requirements of the coverage range; when the length of the GP is N OFDM symbols, the corresponding coverage range is 10*N km, wherein when short CP configuration is employed, $0 \leq N \leq 13$, when long CP configuration is employed, $0 \leq N \leq 11$, and when N takes the maximum, the length of the UpPTS is 0 OFDM symbol.

2) The configuration mode of a random access channel (PRACH) of the system is as shown in FIG. 8, and the PRACH is configured to be transmitted in the UpPTS; at this point, the length of UpPTS is set to be more than 2 OFDM symbols, and the location of the PRACH in the UpPTS may be the first two or the last two OFDM symbols in the UpPTS.

The time and frequency domain resources in the UpPTS, except the time frequency resources occupied by the PRACH, may be used for transmitting at least one of uplink control signaling, uplink data, an uplink reference signal, and an uplink detection signal.

The PRACH occupies 6 resource blocks on the frequency domain, and the specific frequency domain location is preset by the system, and it may vary with time.

Process 603: the network side and a terminal carry out service transmission via the frame structure configured.

It should be noted that, after Process 601, it may further include Process 604: the frame structure configuration result used for transmitting a service is pre-stored at the network side and a terminal. The specific method is the same as that in the prior art, so it is omitted here.

Furthermore, after Process 602, it may further include Process 605: the network side transmits the configured frame structure information containing the lengths of the DwPTS, GP and UpPTS to a terminal; and the terminal configures its own frame structure according to the frame structure configuration result pre-stored and the lengths of the DwPTS, GP and UpPTS received. The specific method is the same as that in the prior art, so it is omitted here.

It can be seen from the above description that, by the transmission method according to the embodiment of the invention, the CP length may be shortened; in the prior art, the length of the short CP is 8.33 μs, and the length of the long CP is 17.71 μs, while in the frame structure employing the transmission method according to the embodiment of the invention, the length of the short CP is about 5 μs, and the length of the long CP is 16.67 μs, thus avoiding the length of the system CP configured is too long in the prior art; furthermore, the resources in the frame structure without specified purpose may be further used for transmitting various signaling and data; for example, the resources in the DwPTS, except the resources for the P-SCH, may be used for transmitting downlink control signaling, downlink data, downlink reference signal or any combination thereof. Therefore, the resource utilization may be improved, and the transmission efficiency of the system may be increased.

Furthermore, the subframe length in the frame structure configured by the transmission method is 1 ms, and the subframe contains two consecutive service time slots which are configured for use in pair, so that not only the complexity of resource scheduling and so on may be reduced, but also the transmission of hopping frequency between time slots may be implemented conveniently; moreover, in comparison with the original subframe of 0.675 ms, the disadvantage that the uplink coverage is limited by short subframe length can be overcome after the length is increased.

Furthermore, the frame structure has a good consistency with Type1, and its subframe length, time slot length and OFDM symbol parameters are the same as those of Type1, so that an equipment based on FDD/TDD double working mode can be implemented more easily, which is favorable for the mutual coexistence of equipments based on FDD and TDD standards.

Figure 9:
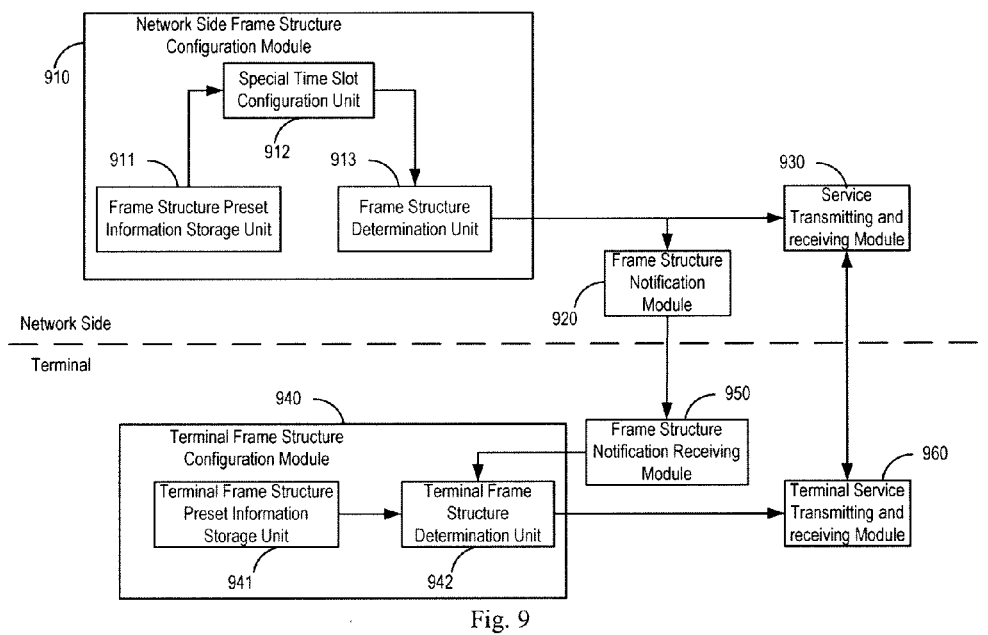
FIG. 9 is a schematic diagram showing a structure of a transmission apparatus of a TDD system according to an embodiment of the invention.

Additionally, an embodiment of the invention further provides a transmission apparatus of a TDD system corresponding to the above method, and FIG. 9 is a schematic diagram showing the structure of the transmission apparatus according to a preferred embodiment of the invention, which includes:

a network side frame structure configuration module 910, a frame structure notification module 920 and a service transmitting and receiving module 930 that are set on the network side; and a terminal frame structure configuration module 940, a frame structure notification receiving module 950 and a terminal service transmitting and receiving module 960 that are set on the terminal side.

The network side frame structure configuration module 910 is adapted to store preset information of the frame structure, determine the lengths of the DwPTS, GP and UpPTS in the special time slot field according to the preset information and the requirements of the system on the coverage range, determine radio frame structure information used for service transmission, and transmit the frame structure information to the frame structure notification module 920 and the service transmitting and receiving module 930.

The preset information includes: configuring the radio frame structure used by the system for service transmission as containing 2 half-frames each of 5 ms, where each half-frame consists of 8 service time slots each of 0.5 ms and 1 special time slot field of 1 ms, two consecutive service time slots form a subframe of which the length is 1 ms, and the special time slot field contains 3 special time slots, i.e., DwPTS, GP and UpPTS.

The frame structure notification module 920 is adapted to notify the frame structure notification receiving module 950 on the terminal side of the frame structure information containing the lengths of the DwPTS, GP and UpPTS in the special time slot field configured.

The frame structure notification receiving module 950 on the terminal side is adapted to receive the frame structure information transmitted by the frame structure notification module 920 and transmit the frame structure information to the terminal frame structure configuration module 940.

The terminal frame structure configuration module 940 is adapted to store the preset information of the frame structure, which is the same as that stored in the network side frame structure configuration module 910, configure the frame structure of the terminal side according to the preset information and the frame structure information transmitted by the frame structure notification receiving module 950, and transmit the frame structure information it configures to the terminal service transmitting and receiving module 960.

The service transmitting and receiving module 930 set on the network side and the terminal service transmitting and receiving module 960 set on the terminal side use the frame structures configured for service transmission.

In this embodiment, the network side frame structure configuration module 910 set on the network side includes: a network side frame structure preset information storage unit 911, a special time slot configuration unit 912 and a frame structure determination unit 913;

The terminal frame structure configuration module 940 set on the terminal side includes: a terminal frame structure preset information storage unit 941 and a terminal frame structure determination unit 942.

The network side frame structure preset information storage unit 911 set on the network side is adapted to store the preset information of the frame structure and provide the preset information for the special time slot configuration unit 912.

The special time slot configuration unit 912 is adapted to determine the structure of the special time slot field and the lengths of the DwPTS, GP and UpPTS thereof according to the preset information and the requirements of the system on the coverage range.

The frame structure determination unit 913 is adapted to determine the radio frame structure information used for service transmission according to the structure of the special time slot field and the lengths of the DwPTS, GP and UpPTS thereof, and transmit the radio frame structure information to the frame structure notification module 920 and the service transmitting and receiving module 930.

The terminal frame structure preset information storage unit 941 set on the terminal side is adapted to store the preset information of the frame structure and provide the preset information for the terminal frame structure determination unit 942.

The terminal frame structure determination unit 942 is adapted to configure the frame structure of the terminal according to the preset information and the frame structure information transmitted by the frame structure notification receiving module 950, determine the frame structure information used by the terminal, and transmit the frame structure information configured by the terminal itself to the terminal service transmitting and receiving module 960.

Thus it can be seen that, by the transmission method and apparatus for a TDD system according to the embodiments of the invention, the flexible support for different coverage ranges may be implemented, and the system transmission efficiency may be improved.

Figure 10:
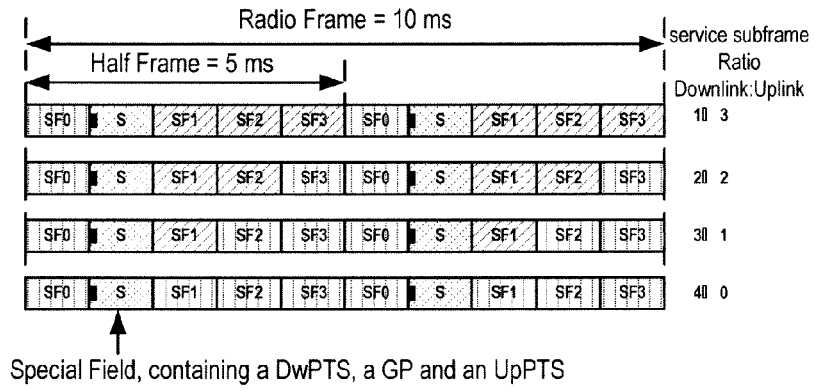
FIG. 10 is a schematic diagram showing subframe allocation patterns which take half of a radio frame as an allocation period according to an embodiment of the invention.

For the above situation in which the configuration modes of uplink and downlink time slots for each half-frame are made the same by taking a half-frame of 5 ms as the allocation period, when a service time slot is allocated for uplink service transmission, it may be referred to as uplink time slot, and two uplink time slots form an uplink service subframe; when a service time slot is allocated for downlink service transmission, it may be referred to as downlink service time slot, and two downlink service time slots form a downlink service subframe. The uplink and downlink service time slots may be allocated flexibly, and it is one of the advantages of TDD mode that different service requirements can be satisfied by adjusting the configuration ratio of uplink service subframe to downlink service subframe. In such a frame structure configured by the LTE TDD system, the two half-frames each of 5 ms contained in a radio frame of 10 ms are totally the same, that is, the allocation of uplink and downlink service time slots can be carried out in the half-frame of 5 ms, and the half-frame of 5 ms is taken as the allocation period of the uplink and downlink time slots; because one subframe contains two service time slots and uplink-downlink switch cannot be carried out in the two service time slots, the allocation period of the uplink and downlink time slots is a subframe allocation period. The allocation mode of all uplink service subframes and downlink service subframes at the subframe allocation period including a half-frame of 5 ms in an LTE TDD system will now be introduced briefly. As shown in FIG. 10, SF0 represents Subframe #0, SF1 represents Subframe #1, SF2 represents Subframe #2, SF3 represents Subframe #3; and S represents the special time slot field, which includes a DwPTS, a GP and an UpPTS. For easy discrimination, the service time slots allocated for downlink service transmission are filled with vertical lines, the service time slots allocated for uplink service transmission are filled with oblique lines, and the special time slot field is filled with dots. It can be seen from FIG. 10 that there are totally four types of configuration ratios of uplink service subframe to downlink service subframe that may be supported by the LTE TDD system, and each configuration ratio corresponds to a type of allocation mode, which is represented by a subframe allocation pattern in FIG. 10, respectively as follows: in the first allocation mode, SF0 is a downlink service subframe, SF1, SF2 and SF3 are uplink service subframes, and the configuration ratio of downlink service subframe to uplink service subframe is 1:3; in the second allocation mode, SF0 and SF3 are downlink service subframes, SF1 and SF2 are uplink service subframes, and the configuration ratio of downlink service subframe to uplink service subframe is 2:2; in the third allocation mode, SF0, SF2 and SF3 are downlink service subframes, SF1 is an uplink service subframe, and the configuration ratio of downlink service subframe to uplink service subframe is 3:1; in the fourth allocation mode, SF0, SF1, SF2 and SF3 are all downlink service subframes, and the configuration ratio of downlink service subframe to uplink service subframe is 4:0. At the subframe allocation period including a half-frame of 5 ms, the corresponding adjustment granularity of service subframe ratio is 25%. Since the adjustment granularity of service subframe ratio is relatively large, the adjustment is not flexible enough when different service requirements are satisfied; a pair of uplink-downlink switch-points is configured for each half-frame, which corresponds to a downlink-to-uplink GP, and because the GP is determined by the coverage range of a base station, a large overhead of the GP may be caused in a large coverage range scenario.

However, for the above case that the configuration modes of uplink and downlink time slots in two half-frames each of 5 ms in the radio frame are made mutually independent by taking a radio frame of 10 ms as the allocation period, the adjustment granularity of service subframe ratio can be decreased, and the flexibility of satisfying different service requirements can be enhanced. The specific subframe allocation method at the subframe allocation period including at least one radio frame of 10 ms will be introduced in detail below.

In an embodiment of the invention, the configuration ratio of uplink service subframe to downlink service subframe and the corresponding allocation mode of uplink service subframes and downlink service subframes are introduced in detail by taking a radio frame of 10 ms as the subframe allocation period. Two pairs of uplink-downlink switch-points may be configured in one radio frame at most. There may be specifically the following allocation modes according to the number of pairs of the uplink-downlink switch-points configured, which will be introduced in detail below.

Figure 11:
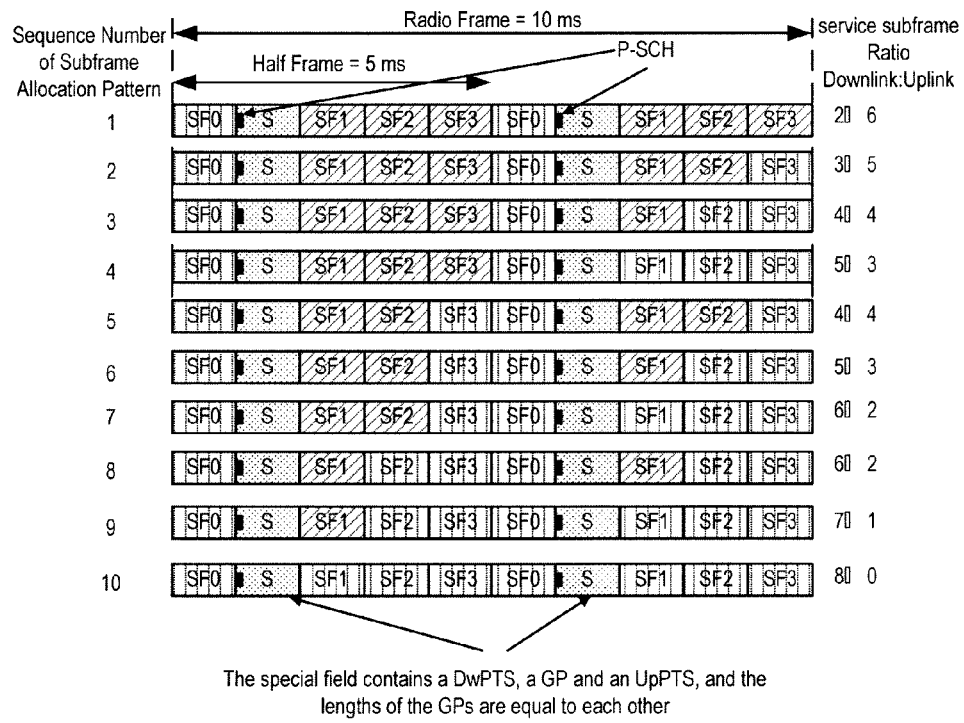
FIG. 11 is a schematic diagram of subframe allocation patterns which take a radio frame as a subframe allocation period and have 2 pairs of switch-points according to an embodiment of the invention.

When 2 pairs of switch-points are configured in a radio frame of 10 ms, there are totally 10 allocation modes, and each allocation mode corresponds to a subframe allocation pattern, as shown in FIG. 11. For easy comparison, the same representation method is employed in FIG. 11 and FIG. 10, where SF0 represents Subframe #0, SF1 represents Subframe #1, SF2 represents Subframe #2, SF3 represents Subframe #3, and S represents the special time slot field, which includes a DwPTS, a GP and an UpPTS. The service time slots allocated for downlink service transmission are filled with vertical lines, the service time slots allocated for uplink service transmission are filled with oblique lines, and the special time slot field is filled with dots. The subframe allocation patterns of the two half-frames each of 5 ms in the radio frame of 10 ms may be the same or different. Now, 10 subframe allocation patterns will be introduced in detail according to the sequence numbers in FIG. 11.

In the subframe allocation pattern with sequence number 1, for each half-frame of 5 ms, SF0 is a downlink service subframe, SF1, SF2 and SF3 are uplink service subframes, and the configuration ratio of downlink service subframe to uplink service subframe is 2:6;

In the subframe allocation pattern with sequence number 2, for one half-frame of 5 ms, SF0 is a downlink service subframe, SF1, SF2 and SF3 are uplink service subframes; for the other half-frame of 5 ms, SF0 and SF3 are downlink service subframes, SF1 and SF2 are uplink service subframes; and the configuration ratio of downlink service subframe to uplink service subframe is 3:5;

In the subframe allocation pattern with sequence number 3, for one half-frame of 5 ms, SF0 is a downlink service subframe, SF1, SF2 and SF3 are uplink service subframes; for the other half-frame of 5 ms, SF0, SF2 and SF3 are downlink service subframes, SF1 is an uplink service subframe; and the configuration ratio of downlink service subframe to uplink service subframe is 4:4;

In the subframe allocation pattern with sequence number 4, for one half-frame of 5 ms, SF0 is a downlink service subframe, SF1, SF2 and SF3 are uplink service subframes; for the other half-frame of 5 ms, SF0, SF1, SF2 and SF3 are all downlink service subframes; and the configuration ratio of downlink service subframe to uplink service subframe is 5:3;

In the subframe allocation pattern with sequence number 5, for each half-frame of 5 ms, SF0 and SF3 are downlink service subframes, SF1 and SF2 are uplink service subframes, and the configuration ratio of downlink service subframe to uplink service subframe is 4:4;

In the subframe allocation pattern with sequence number 6, for one half-frame of 5 ms, SF0 and SF3 are downlink service subframes, SF1 and SF2 are uplink service subframes; for the other half-frame of 5 ms, SF0, SF2 and SF3 are downlink service subframes, SF1 is an uplink service subframe; and the configuration ratio of downlink service subframe to uplink service subframe is 5:3;

In the subframe allocation pattern with sequence number 7, for one half-frame of 5 ms, SF0 and SF3 are downlink service subframes, SF1 and SF2 are uplink service subframes; for the other half-frame of 5 ms, SF0, SF1, SF2 and SF3 are all downlink service subframes; and the configuration ratio of downlink service subframe to uplink service subframe is 6:2;

In the subframe allocation pattern with sequence number 8, for both half-frames each of 5 ms, SF0, SF2 and SF3 are downlink service subframes, SF1 is an uplink service subframe; and the configuration ratio of downlink service subframe to uplink service subframe is 6:2;

In the subframe allocation pattern with sequence number 9, for one half-frame of 5 ms, SF0, SF2 and SF3 are downlink service subframes, SF1 is an uplink service subframe; for the other half-frame of 5 ms, SF0, SF1, SF2 and SF3 are all downlink service subframes; and the configuration ratio of downlink service subframe to uplink service subframe is 7:1;

In the subframe allocation pattern with sequence number 10, for both half-frames each of 5 ms, SF0, SF1, SF2 and SF3 are all downlink service subframes; and the configuration ratio of downlink service subframe to uplink service subframe is 8:0.

When 2 pairs of switch-points are configured in one radio frame, the special time slot fields in the two half-frames of the radio frame may be configured independently, that is, the lengths of the DwPTS and the UpPTS in the two special time slot fields may be unequal, but the length of the GP in the two half-frames should be equal to each other, which is configured according to the requirements on the coverage range of the base station.

Figure 12:
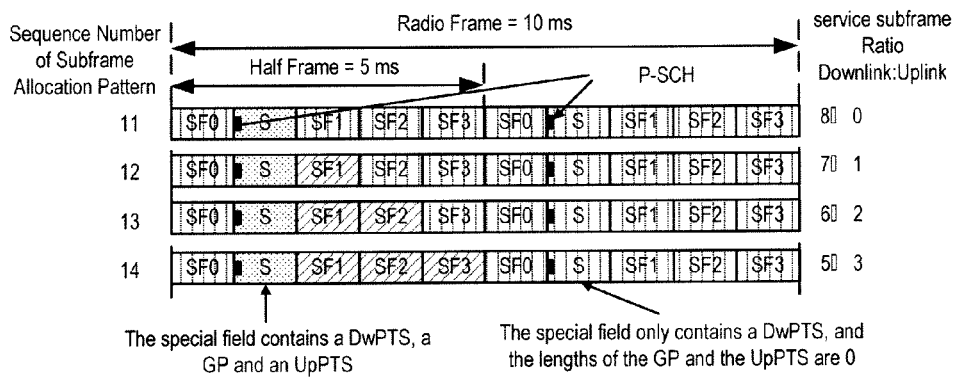
FIG. 12 is a schematic diagram of subframe allocation patterns which takes a radio frame as a subframe allocation period and have 1 pair of switch-points according to an embodiment of the invention.

When 1 pair of switch-points is configured in one radio frame of 10 ms, there are totally 4 allocation modes, and each allocation mode corresponds to a subframe allocation pattern, as shown in FIG. 12, the same representation method as FIG. 11 is employed, except that for the special time slot field, if no DUSP is configured in the special time slot field, it is complete downlink transmission, then similarly, the special time slot field is filled with vertical lines; if a DUSP is configured in the special time slot field, the special time slot field is filled with dots. The sequence numbers of the subframe allocation patterns in FIG. 12 are arranged in continuation with those of FIG. 11, and the 4 subframe allocation patterns will now be introduced in detail according to the sequence numbers in FIG. 12.

In the subframe allocation pattern with sequence number 11, for both half-frames each of 5 ms, SF0, SF1, SF2 and SF3 are all downlink service subframes; the configuration ratio of downlink service subframe to uplink service subframe is 8:0; and a pair of switch-points is configured for one half-frame thereof;

In the subframe allocation pattern with sequence number 12, for one half-frame of 5 ms, SF0, SF2 and SF3 are downlink service subframes, SF1 is an uplink service subframe, and a pair of switch-points is configured for said half-frame; for the other half-frame of 5 ms, SF0, SF1, SF2 and SF3 are all downlink service subframes, and no switch-point is configured for said half-frame; the configuration ratio of downlink service subframe to uplink service subframe is 7:1;

In the subframe allocation pattern with sequence number 13, for one half-frame of 5 ms, SF0 and SF3 are downlink service subframes, SF1 and SF2 are uplink service subframes, and a pair of switch-points is configured for said half-frame; for the other half-frame of 5 ms, SF0, SF1, SF2 and SF3 are all downlink service subframes, and no switch-point is configured for said half-frame; the configuration ratio of downlink service subframe to uplink service subframe is 6:2;

In the subframe allocation pattern with sequence number 14, for one half-frame of 5 ms, SF0 is a downlink service subframe, SF1, SF2 and SF3 are uplink service subframes, and a pair of switch-points is configured for said half-frame; for the other half-frame of 5 ms, SF0, SF1, SF2 and SF3 are all downlink service subframes, and no switch-point is configured for said half-frame; the configuration ratio of downlink service subframe to uplink service subframe is 5:3.

When 1 pair of switch-points is configured in one radio frame, only one half-frame of the radio frame is configured with a pair of switch-points, the special time slot field thereof consists of a DwPTS, a GP and an UpPTS, and the length of the GP is configured according to the requirements on the coverage range of the base station. The configuration in the other half-frame is complete downlink transmission, all service time slots are downlink time slots, the special time slot field thereof only contains a DwPTS, and the lengths of GP and UpPTS are both 0.

Figure 13:
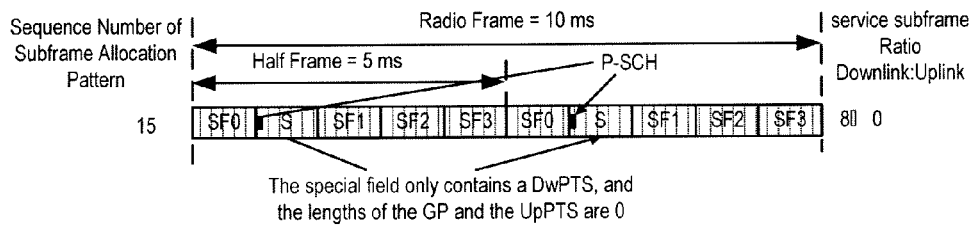
FIG. 13 is a schematic diagram of subframe allocation patterns which take a radio frame as a subframe allocation period and have no switch-point according to an embodiment of the invention.

When no switch-point is configured in a radio frame of 10 ms, there exists 1 allocation mode corresponding to one subframe allocation pattern, as shown in FIG. 13. A representation method the same as that in FIG. 12 is employed, and the sequence number of the subframe allocation pattern is arranged in continuation with those of FIG. 12, which will be introduced below.

In the subframe allocation pattern with sequence number 15, for both half-frames each of 5 ms, SF0, SF1, SF2 and SF3 are all downlink service subframes; the configuration ratio of downlink service subframe to uplink service subframe is 8:0; and no switch-point is configured in the two half-frames.

When no switch-point is configured in one radio frame, each half-frame in the radio frame is configured for complete downlink transmission, all service time slots are downlink time slots, the special time slot fields all contain a DwPTS only, the lengths of GP and UpPTS are 0, and it is used for multicast broadcast single frequency network (MBSFN).

When a pair of switch-points is configured for one half-frame of one radio frame, the DUSP thereof lies in the special time slot GP, and the UDSP lies on the border of a subframe rather than Subframe #0; when the four subframes for one half-frame of one radio frame are all downlink service subframes, a pair of switch-points may be configured, or no switch-point may be configured, when a pair of switch-points is configured, the DUSP lies in the special time slot GP, and the UDSP lies on the border of Subframe #1.

When a radio frame of 10 ms is taken as the subframe allocation period, 15 allocation modes of uplink service subframes and downlink service subframes are supported, which represent as 15 subframe allocation patterns, so that the number of configuration ratios of uplink service subframe to downlink service subframe supported in a TDD system may reach 7, which is 3 greater than that in the case of taking a half-frame of 5 ms as the subframe allocation period, the configuration ratios of downlink service subframe to uplink service subframe are 2:6, 3:5, 4:4, 5:3, 6:2, 7:1 and 8:0 respectively, and the adjustment granularity of service subframe ratio is changed to 12.5%, so that the adjustment can be more flexible and accurate, and the flexibility of satisfying different service requirements can be enhanced. 7 configuration ratios of uplink service subframe to downlink service subframe are supported in the 15 allocation modes of uplink service subframes and downlink service subframes, so that some configuration ratios may be supported by a plurality of allocation modes. For example, when the configuration ratio of downlink service subframe to uplink service subframe is 7:1, there are two allocation modes corresponding to configure one pair of switch-points and two pairs of switch-points in the radio frame, respectively. Because the time delay may be reduced by increasing the number of pairs of switch-points, the allocation mode of two pairs of switch-points may be preferred when a low time delay is required by the system; because the overhead of GP may be decreased by reducing the number of pairs of switch-points, the allocation mode of one pair of switch-points is preferred when the base station coverage range required by the system is relatively large; and the specific allocation mode may be selected flexibly according to the practical requirements of the system.

When a radio frame of 10 ms is taken as the subframe allocation period, totally 15 allocation modes may be supported, and the various allocation modes may be indicated by the base station via a 4 bits signaling in a broadcast message; for example, 0000 represents the allocation mode corresponding to the subframe allocation pattern with sequence number 1, 0001 represents the allocation mode corresponding to the subframe allocation pattern with sequence number 2, and the like. Furthermore, in order to guarantee the search performance of a cell, the primary synchronization signal (P-SCH) of the base station is transmitted once for each half-frame, and the specific location of the P-SCH is in the first OFDM symbol of each DwPTS.

However, the subframe allocation period is not limited to one radio frame, and it may be more than one radio frames. For example, when two radio frames are taken as the subframe allocation period, the corresponding configuration ratios of uplink service subframe to downlink service subframe may include 4:12, 5:11, 6:10, and 7:9, and the corresponding adjustment granularity of service subframe ratio is 6.25%. The object of decreasing the adjustment granularity of service subframe ratio and enhancing the flexibility of satisfying different service requirements may be attained when the subframe allocation period is at least one radio frame.

Figure 14:
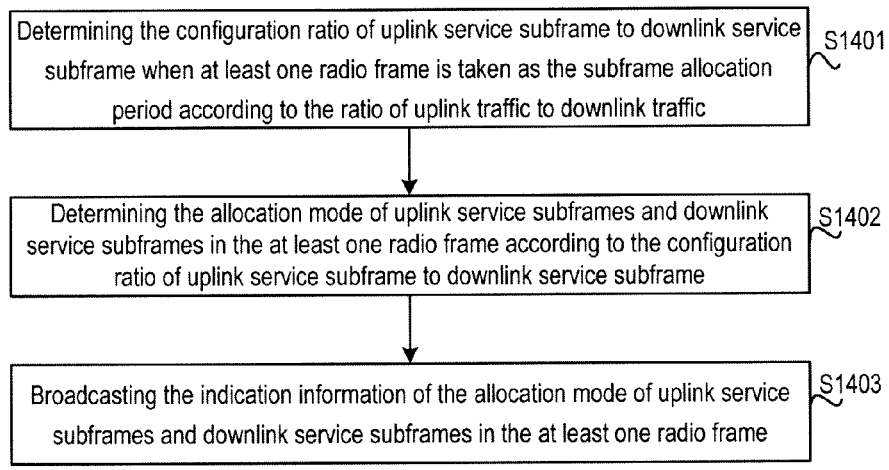
FIG. 14 is a flow chart of a subframe allocation method on the base station side according to an embodiment of the invention.

Based on the above analysis, an embodiment of the invention provides a method for allocating subframes of a TDD system, as shown in FIG. 14, which includes:

S1401: the configuration ratio of uplink service subframe to downlink service subframe is determined when at least one radio frame is taken as the subframe allocation period according to the ratio of uplink traffic to downlink traffic.

A measurement period may be set, and the uplink traffic and downlink traffic of a cell may be measured in the measurement period, thereby the ratio of uplink traffic to downlink traffic may be determined, and it may be configured and updated in the base station; furthermore, a ratio of uplink traffic to downlink traffic required by the system may also be set manually and configured in the base station.

S1402: the allocation mode of uplink service subframes and downlink service subframes in the at least one radio frame is determined according to the configuration ratio of uplink service subframe to downlink service subframe.

By processes S1401 and S1402, the subframe allocation on the base station side has been completed, and the following processes may be further included to implement the communication between the base station and a user equipment.

S1403: indication information of the allocation mode of uplink service subframes and downlink service subframes in the at least one radio frame is broadcast.

The indication information is broadcast by the base station via a broadcast channel, if one radio frame is taken as the subframe allocation period, the allocation mode determined may be indicated by using a 4 bits signaling.

In an embodiment, according to the number of pairs of switch-points configured in the allocation mode, the time delay or the base station coverage range required by the system may also be considered synthetically, and the optimal allocation mode is selected according to the system requirements. Specifically, it may be divided into two situations:

when the base station coverage range required by the system is larger than or equal to a preset first threshold, an allocation mode in which a pair of switch-points is configured for one half-frame thereof is selected; and when the time delay required by the system is less than or equal to a preset second threshold, an allocation mode in which a pair of switch-points is configured for each half-frame is selected.

Figure 15:
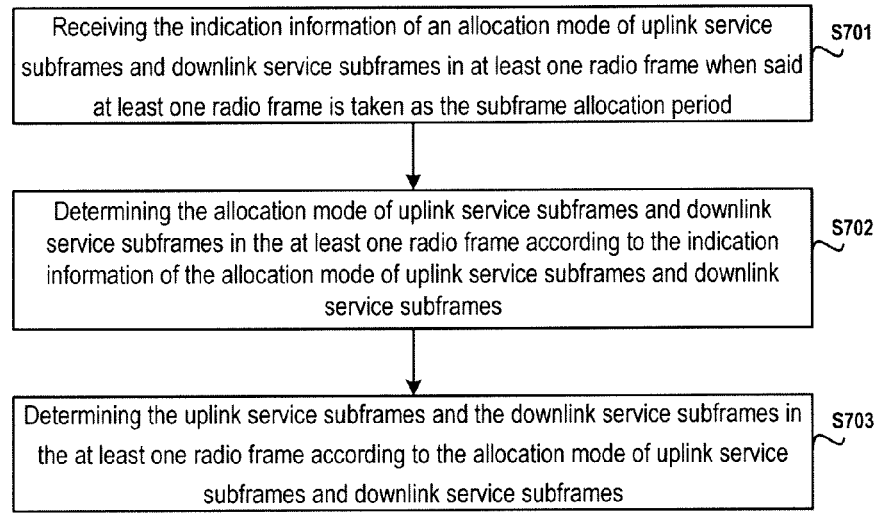
FIG. 15 is a flow chart of a subframe allocation method on the user equipment side according to an embodiment of the invention.

According to the subframe allocation method on the base station side, a method for allocating subframes of a TDD system on the user equipment side is also provided, as shown in FIG. 15, which includes:

S701: the indication information of an allocation mode of uplink service subframes and downlink service subframes in at least one radio frame when said at least one radio frame is taken as the subframe allocation period is received;

S702: the allocation mode of uplink service subframes and downlink service subframes in the at least one radio frame is determined according to the indication information of the allocation mode of uplink service subframes and downlink service subframes; and S703: the uplink service subframes and downlink service subframes in the at least one radio frame is determined according to the allocation mode of uplink service subframes and downlink service subframes.

Thus, the base station and the user equipment employ the same frame structure, and they may communicate via the frame structure configured.

Figure 16:
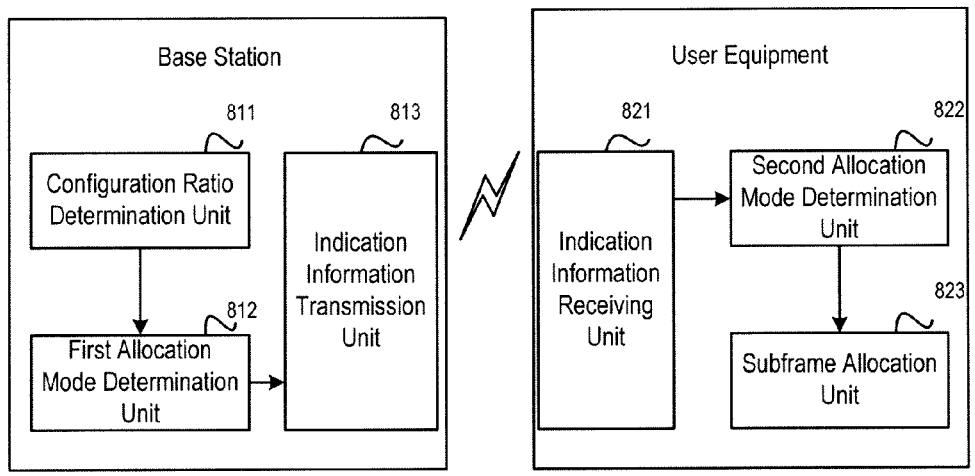
FIG. 16 is a block diagram of a subframe allocation apparatus of a TDD system according to an embodiment of the invention.

In an embodiment of the invention, a subframe allocation apparatus of a TDD system is provided in the base station and the user equipment respectively, as shown in FIG. 16. The subframe allocation apparatus on the base station side includes:

a configuration ratio determination unit 811, for determining the configuration ratio of uplink service subframe to downlink service subframe when at least one radio frame is taken as the subframe allocation period according to the ratio of uplink traffic to downlink traffic; and a first allocation mode determination unit 812, for determining the allocation mode of uplink service subframes and downlink service subframes in the at least one radio frame according to the configuration ratio of uplink service subframe to downlink service subframe.

In order to make the base station and the user equipment employ the same frame structure, the subframe allocation apparatus on the base station side further includes:

an indication information transmission unit 813, for broadcasting the indication information of the allocation mode of uplink service subframes and downlink service subframes in the at least one radio frame.

The subframe allocation apparatus on the user equipment side includes:

an indication information receiving unit 821, for receiving the indication information of an allocation mode of uplink service subframes and downlink service subframes in at least one radio frame when said at least one radio frame is taken as the subframe allocation period;

a second allocation mode determination unit 822, for determining the allocation mode of uplink service subframes and downlink service subframes in said at least one radio frame according to the indication information; and a subframe allocation unit 823, for determining the uplink service subframes and downlink service subframes in the at least one radio frame according to the allocation mode of uplink service subframes and downlink service subframes.

In the subframe allocation solution for a TDD system according to the embodiments of the invention, the allocation mode of uplink service subframes and downlink service subframes can be selected according to the ratio of uplink traffic to downlink traffic, thus the adjustment granularity of service subframe ratio can be decreased, and the flexibility of satisfying different service requirements can be enhanced.

In this solution, it synthetically considers the time delay and the base station coverage range required by the system; in a large coverage range scenario, the overhead of GP may be effectively decreased by selecting the allocation mode that only one pair of switch-points is configured, and in the case that a low time delay is required by the system, the time delay of the system may be effectively controlled by selecting the allocation mode in which a pair of switch-points is configured for each half-frame.

The $3^{rd}$ Generation Mobile Communication (3G) employs the Code Division Multiple Access (CDMA) technology, and it supports multimedia services. CDMA of TDD mode includes two types of systems: Time Division CDMA (TD-CDMA) and Time Division-Synchronous CDMA (TD-SCDMA). In the International Telecommunication Union (ITU) standard, TD-CDMA is referred to as High Chips Rate (HCR) TDD, and TD-SCDMA is referred to as Low Chips Rate (LCR) TDD.

Figure 17:
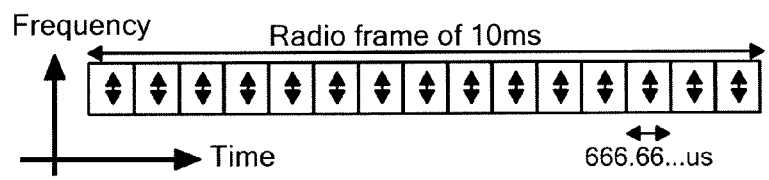
FIG. 17 is a schematic diagram of a frame structure of a TD-CDMA system in the prior art.

Among the three international standards of 3G system, TD-SCDMA is the only standard that supports the TDD mode. TD-SCDMA supports uplink and downlink asymmetrical service transmission, and it has a relatively large flexibility on the utilization of frequency spectrum. At present, TD-CDMA already has some commercial networks, and the frame structure thereof is as shown in FIG. 17, where a radio frame of 10 ms is equally divided into 15 time slots, the length of each time slot is 666.66 µs, and each time slot may be allocated for uplink service transmission or downlink service transmission, the time slot allocated for uplink service transmission is referred to as uplink time slot, and the time slot allocated for downlink service transmission is referred to as downlink time slot. One radio frame of 10 ms at least has one downlink time slot and one uplink time slot.

In order to guarantee the coexistence with TD-SCDMA standard which is the only standard based on TDD mode in a 3G system, the LTE TDD system employs the frame structure as shown in FIG. 7. As described above, the compatibility with a TD-SCDMA system is considered in the configuration of the frame structure in the LTE TDD system, that is, the DwPTS is configured in length to contain at least one OFDM symbol, the DwPTS contains a primary synchronization channel, and the primary synchronization channel is transmitted over the first OFDM symbol of the DwPTS, so that the coexistence of an LTE TDD system with a TD-SCDMA system may be implemented; however, in the above frame structure configuration of the LTE TDD system, the compatibility with a TD-CDMA system is not considered. In an area where a TD-CDMA network has been deployed, when an LTE TDD network needs to be deployed, serious inter-system interference may be caused between the TD-CDMA system and the LTE TDD system, which may cause both of the systems unable to work normally.

Figure 18:
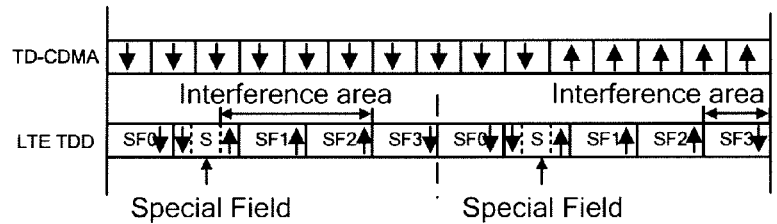
FIG. 18 is a schematic diagram showing the coexistence interference between an LTE TDD system and a TD-CDMA system according to an embodiment of the invention.

As shown in FIG. 18, in the case that a TD-CDMA system and an LTE TDD system exist at the same time, because the compatibility between the two systems is not considered in the design of frame structure, a superposed area of uplink time slot and downlink time slot may exist in the radio frames of the two systems, which is referred to as an interference area, and may cause serious inter-system interference. For example, in a certain interference are, the TD-CDMA system transmits downlink data, while the LTE TDD system receives uplink data at the same time, then the LTE TDD system may receive the downlink data transmitted by the TD-CDMA system in a certain time slot, and the LTE TDD system takes the downlink data as the uplink data that needs to be received by the system to process, thus a strong interference may be caused on the LTE TDD system by the TD-CDMA system; on the contrary, in a certain interference area, if the LTE TDD system transmits downlink data, while the TD-CDMA system receives uplink data at the same time, a strong interference may be caused on the TD-CDMA system by the LTE TDD system. The interference caused by the superposition of uplink time slot and downlink time slot in the radio frames of two types of TDD systems may make both systems unable to work normally.

Therefore, an embodiment of the invention further provides a method and an apparatus for the coexistence of TDD systems, so that the switch-point of the radio frame in a first TDD system align with the switch-point of the radio frame in a second TDD system, thereby decreasing inter-system interference and implementing the coexistence of the first TDD system and the second TDD system.

In the embodiment of the invention, it is illustrated by taking an LTE TDD system as the first TDD system and taking a TD-CDMA system as the second TDD system, and the method for the coexistence of TDD systems according to the embodiment of the invention may be employed when the coexistence problem of two types of TDD systems with the same frame structures as the LTE TDD system and the TD-CDMA system respectively is solved.

Figure 19:
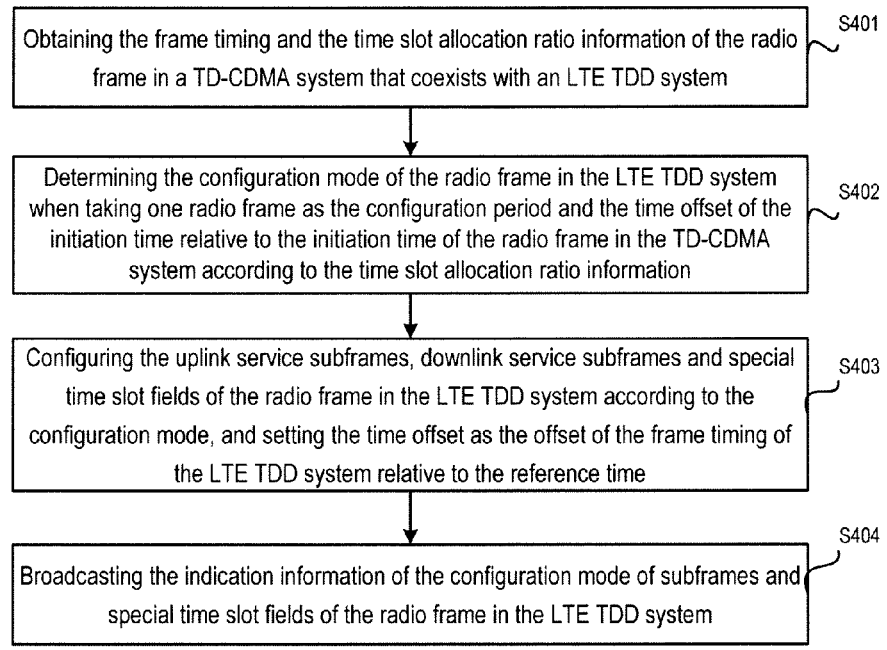
FIG. 19 is a flow chart of a method for the coexistence of TDD systems according to an embodiment of the invention.
Figure 20:
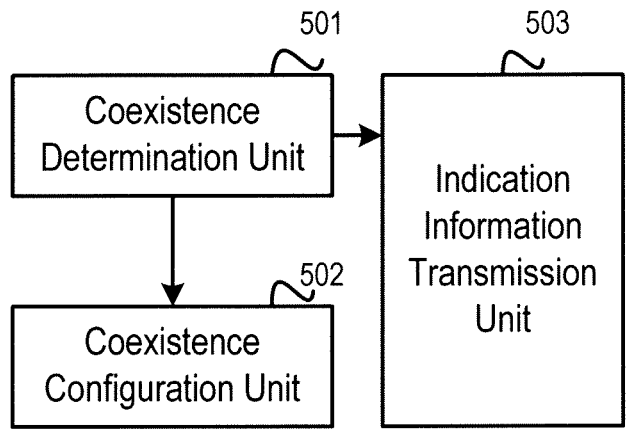
FIG. 20 is a block diagram of an apparatus for the coexistence of TDD systems according to an embodiment of the invention.

An embodiment of the invention provides a method for the coexistence of TDD systems, as shown in FIG. 19, which includes:

S401: frame timing and time slot allocation ratio information of the radio frame in a TD-CDMA system that coexists with an LTE TDD system are obtained.

The frame timing and the time slot allocation ratio information of the TD-CDMA system may also be directly configured in the base station during the configuration of the LTE TDD system.

S402: a configuration mode of subframes and special time slot fields of the radio frame in the LTE TDD system and a time offset of an initiation time of the radio frame in the LTE TDD system relative to an initiation time of the radio frame in the TD-CDMA system when taking one radio frame as the configuration period and making the switch-points of the radio frame in the LTE TDD system align with the switch-points of the radio frame of the radio frame in the TD-CDMA system according to the time slot allocation ratio information of the radio frame in the TD-CDMA system.

S403: uplink service subframes, downlink service subframes and special time slot fields of the radio frame in the LTE TDD system are configured according to the configuration mode, and the time offset is set as the offset of the frame timing of the LTE TDD system relative to a reference time by taking the initiation time of the radio frame in the TD-CDMA system as the reference time according to the frame timing of the TD-CDMA system.

The coexistence of a TD-CDMA system and an LTE TDD system has been implemented via S401, S402 and S403, and in order to implement the normal communication between the base station and a user equipment in the LTE TDD system, the following process is further included:

S404: indication information of the configuration mode of subframes and special time slot fields of the radio frame in the LTE TDD system is broadcast.

The user equipment implements the synchronization with the base station according to the frame timing of the LTE TDD system it maintains, learns about the configuration mode of subframes and special time slot fields of the radio frame according to the indication information of the configuration mode of subframes and special time slot fields of the radio frame, and configures the uplink service subframe, downlink service subframe and special time slot field in the radio frame transmitted by the equipment according to the configuration mode, thereby implementing the normal communication between the user equipment and the base station in the LTE TDD system.

Furthermore, an embodiment of the invention provides an apparatus for the coexistence of TDD systems, which is set in the base station of an LTE TDD system and includes:

a coexistence determination unit 501, for determining a configuration mode of subframes and special time slot fields of the radio frame in an LTE TDD system and a time offset of an initiation time of the radio frame in the LTE TDD system relative to an initiation time of the radio frame in a TD-CDMA system when making the switch-point of the radio frame in the LTE TDD system align with the switch-point of the radio frame in the TD-CDMA system by taking one radio frame as the configuration period according to the time slot allocation ratio information of the radio frame in the TD-CDMA system that coexists with the LTE TDD system; and a coexistence configuration unit 502, for configuring the uplink service subframe, downlink service subframe and special time slot field of the radio frame in the LTE TDD system according to the configuration mode, and setting the time offset as the offset of the frame timing of the LTE TDD system relative to a reference time according to the frame timing of the TD-CDMA system by taking the initiation time of the radio frame in the TD-CDMA system as the reference time.

In order to implement the normal communication between the base station and a user equipment in the LTE TDD system, the apparatus further includes:

an indication information transmission unit 503, for broadcasting indication information of the configuration mode of subframes and special time slot fields of the radio frame in the LTE TDD system.

The configuration mode of subframes and special time slot fields of the radio frame in the LTE TDD system according to the embodiment of the invention and the time offset of the initiation time of the radio frame in the LTE TDD system relative to the initiation time of the radio frame in the TD-CDMA system will now be introduced in detail below according to various time slot allocation ratio information of the radio frame in the TD-CDMA system.

Figure 21:
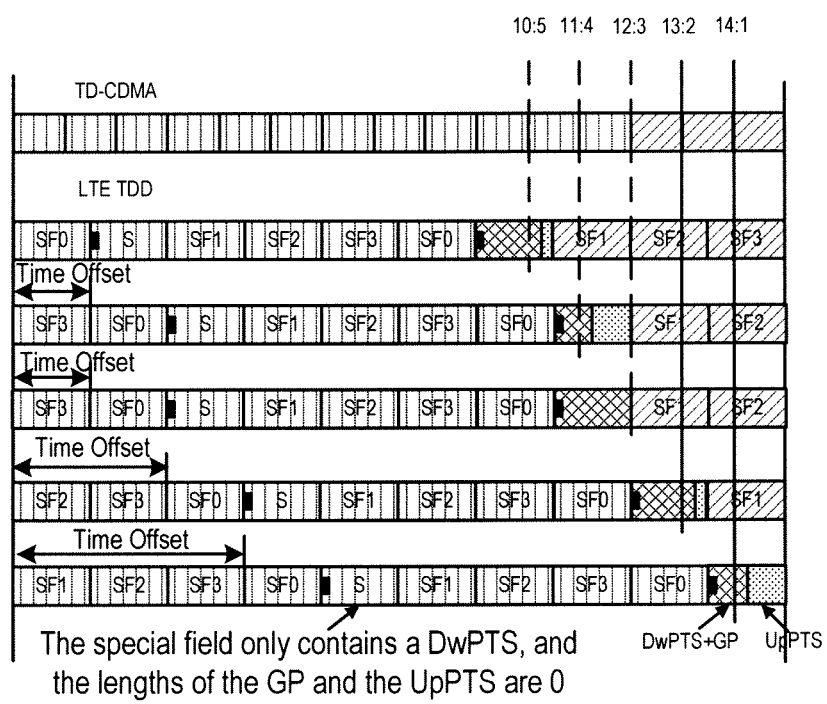
FIG. 21 is a schematic diagram of a configuration mode for configuring a pair of switch-points in a radio frame according to an embodiment of the invention.

In the case that a pair of switch-points is configured in each radio frame of 10 ms in the TD-CDMA system and the allocation ratios of downlink time slots to uplink time slots are respectively 14:1, 13:2, 12:3, 11:4 and 10:5, a radio frame of 10 ms is taken as the configuration period in the LTE TDD system, and only one pair of switch-points is configured in the radio frame of 10 ms, the specific configuration mode of subframes and special time slot fields is as shown in FIG. 21. Each symbol in FIG. 21 is introduced as follows: SF0 represents Subframe #0, SF1 represents Subframe #1, SF2 represents Subframe #2, SF3 represents Subframe #3, and each subframe consists of two service time slots; S represents a special time slot field, which contains a DwPTS, a GP and an UpPTS; the subframe allocated for downlink service transmission is filled with vertical lines, and the subframe allocated for uplink service transmission is filled with oblique lines; for the special time slot field, if no DUSP is configured in the special time slot field, the special time slot field is used for complete downlink transmission, thus it is also filled with vertical lines; if a DUSP is configured in the special time slot field, the areas configured as DwPTS and GP in the special time slot field are filled with grids, and the area configured as UpPTS is filled with dots. FIG. 21 only shows a special situation in which the ratio of downlink time slot to uplink time slot of the radio frame in the TD-CDMA system is 12:3, and the situations of other ratios are not represented. Introductions will be provided below respectively.

When the ratio of downlink time slot to uplink time slot in the TD-CDMA system is 14:1, in the radio frame of 10 ms of the LTE TDD system:

For one half-frame of 5 ms, SF0, SF1, SF2 and SF3 are all downlink service subframes, no switch-point is configured for said half-frame, and the special time slot field only contains a DwPTS, when short CP configuration is employed, the length of DwPTS is 14 OFDM symbols, or when long CP configuration is employed, the length of DwPTS is 12 OFDM symbols, and the lengths of GP and UpPTS are 0;

For the other half-frame of 5 ms, SF0, SF1, SF2 and SF3 are all downlink service subframes, and a pair of switch-points is configured for said half-frame, the special time slot field consists of a DwPTS, a GP and an UpPTS, when short CP configuration is employed, the sum of the lengths of DwPTS and GP is 7 OFDM symbols and the length of DwPTS is less than or equal to 4 OFDM symbols, the length of UpPTS is 7 OFDM symbols, or when long CP configuration is employed, the sum of the lengths of DwPTS and GP is 6 OFDM symbols, and the length of DwPTS is less than or equal to 4 OFDM symbols, the length of UpPTS is 6 OFDM symbols.

When the ratio of downlink time slot to uplink time slot in the TD-CDMA system is 13:2, in the radio frame of 10 ms of the LTE TDD system:

For one half-frame of 5 ms, SF0, SF1, SF2 and SF3 are all downlink service subframes, no switch-point is configured for said half-frame, and the special time slot field only contains a DwPTS, when short CP configuration is employed, the length of DwPTS is 14 OFDM symbols, or when long CP configuration is employed, the length of DwPTS is 12 OFDM symbols, and the lengths of GP and UpPTS are 0;

For the other half-frame of 5 ms, SF0, SF2 and SF3 are downlink service subframes, SF1 is an uplink service subframe, and a pair of switch-points is configured for said half-frame, the special time slot field consists of a DwPTS, a GP and an UpPTS, when short CP configuration is employed, the sum of the lengths of DwPTS and GP is 12 OFDM symbols and the length of DwPTS is less than or equal to 9 OFDM symbols, the length of UpPTS is 2 OFDM symbols, or when long CP configuration is employed, the sum of the lengths of DwPTS and GP is 10 OFDM symbols and the length of DwPTS is less than or equal to 8 OFDM symbols, the length of UpPTS is 2 OFDM symbols.

When the ratio of downlink time slot to uplink time slot in the TD-CDMA system is 12:3, in the radio frame of 10 ms of the LTE TDD system:

For one half-frame of 5 ms, SF0, SF1, SF2 and SF3 are all downlink service subframes, and no switch-point is configured for said half-frame, the special time slot field only contains a DwPTS, when short CP configuration is employed, the length of DwPTS is 14 OFDM symbols, or when long CP configuration is employed, the length of DwPTS is 12 OFDM symbols, and the lengths of GP and UpPTS are 0;

For the other half-frame of 5 ms, SF0 and SF3 are downlink service subframes, SF1 and SF2 are uplink service subframes, and a pair of switch-points is configured for said half-frame, the special time slot field consists of a DwPTS, a GP and an UpPTS, when short CP configuration is employed, the sum of the lengths of DwPTS and GP is 14 OFDM symbols and the length of DwPTS is less than or equal to 14 OFDM symbols, the length of UpPTS is 0, or when long CP configuration is employed, the sum of the lengths of DwPTS and GP is 12 OFDM symbols and the length of DwPTS is less than or equal to 12 OFDM symbols, the length of UpPTS is 0.

When the time slot ratio of downlink time slots to uplink time slots in the TD-CDMA system is 11:4, in the radio frame of 10 ms of the LTE TDD system:

For one half-frame of 5 ms, SF0, SF1, SF2 and SF3 are all downlink service subframes, and no switch-point is configured for said half-frame, the special time slot field only contains a DwPTS, when short CP configuration is employed, the length of DwPTS is 14 OFDM symbols, or when long CP configuration is employed, the length of DwPTS is 12 OFDM symbols, and the lengths of GP and UpPTS are 0;

For the other half-frame of 5 ms, SF0 and SF3 are downlink service subframes, SF1 and SF2 are uplink service subframes, and a pair of switch-points is configured for said half-frame, the special time slot field consists of a DwPTS, a GP and an UpPTS, when short CP configuration is employed, the sum of the lengths of DwPTS and GP is 7 OFDM symbols and the length of DwPTS is less than or equal to 4 OFDM symbols, the length of UpPTS is 7 OFDM symbols, or when long CP configuration is employed, the sum of the lengths of DwPTS and GP is 6 OFDM symbols, the length of DwPTS is less than or equal to 4 OFDM symbols, and the length of UpPTS is 6 OFDM symbols.

When the ratio of downlink time slot to uplink time slot in the TD-CDMA system is 10:5, in the radio frame of 10 ms of the LTE TDD system:

For one half-frame of 5 ms, SF0, SF1, SF2 and SF3 are all downlink service subframes, and no switch-point is configured for said half-frame, the special time slot field only contains a DwPTS, when short CP configuration is employed, the length of DwPTS is 14 OFDM symbols, or when long CP configuration is employed, the length of DwPTS is 12 OFDM symbols, and the lengths of GP and UpPTS are 0;

For the other half-frame of 5 ms, SF0 is a downlink service subframe, SF1, SF2 and SF3 are uplink service subframes, and a pair of switch-points is configured for said half-frame, the special time slot field consists of a DwPTS, a GP and an UpPTS, when short CP configuration is employed, the sum of the lengths of DwPTS and GP is 12 OFDM symbols and the length of DwPTS is less than or equal to 9 OFDM symbols, the length of UpPTS is 2 OFDM symbols, or when long CP configuration is employed, the sum of the lengths of DwPTS and GP is 10 OFDM symbols and the length of DwPTS is less than or equal to 8 OFDM symbols, the length of UpPTS is 2 OFDM symbols.

Figure 22:
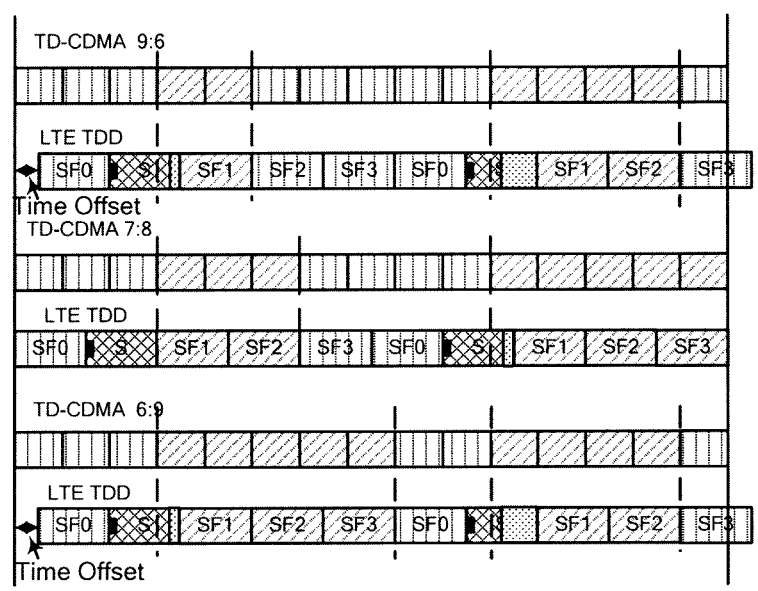
FIG. 22 is a schematic diagram of a configuration mode for configuring two pairs of switch-points in a radio frame according to an embodiment of the invention.

In the case that two pairs of switch-points are configured in each radio frame of 10 ms in the TD-CDMA system and the ratios of downlink time slots to uplink time slots are respectively 9:6, 7:8 and 6:9, a radio frame of 10 ms is taken as the configuration period in the LTE TDD system, and two pairs of switch-points are configured in the radio frame of 10 ms, the specific configuration mode of subframes and special time slot fields is as shown in FIG. 22. The meaning of each symbol in FIG. 22 is the same as that in FIG. 21. Introductions will be provided below respectively.

When the ratio of downlink time slot to uplink time slot in the TD-CDMA system is 9:6, in the radio frame of 10 ms of the LTE TDD system:

For one half-frame of 5 ms, SF0, SF2 and SF3 are downlink service subframes, SF1 is an uplink service subframe, and a pair of switch-points is configured for said half-frame, the special time slot field consists of a DwPTS, a GP and an UpPTS, when short CP configuration is employed, the sum of the lengths of DwPTS and GP is 12 OFDM symbols and the length of DwPTS is less than or equal to 9 OFDM symbols, the length of UpPTS is 2 OFDM symbols, or when long CP configuration is employed, the sum of the lengths of DwPTS and GP is 10 OFDM symbols and the length of DwPTS is less than or equal to 8 OFDM symbols, the length of UpPTS is 2 OFDM symbols;

For the other half-frame of 5 ms, SF0 and SF3 are downlink service subframes, SF1 and SF2 are uplink service subframes, and a pair of switch-points is configured for said half-frame, the special time slot field consists of a DwPTS, a GP and an UpPTS, when short CP configuration is employed, the sum of the lengths of DwPTS and GP is 7 OFDM symbols and the length of DwPTS is less than or equal to 4 OFDM symbols, the length of UpPTS is 7 OFDM symbols, or when long CP configuration is employed, the sum of the lengths of DwPTS and GP is 6 OFDM symbols and the length of DwPTS is less than or equal to 4 OFDM symbols, and the length of UpPTS is 6 OFDM symbols.

When the ratio of downlink time slot to uplink time slot in the TD-CDMA system is 7:8, in the radio frame of 10 ms of the LTE TDD system:

For one half-frame of 5 ms, SF0 and SF3 are downlink service subframes, SF1 and SF2 are uplink service subframes, and a pair of switch-points is configured for said half-frame, the special time slot field consists of a DwPTS, a GP and an UpPTS, when short CP configuration is employed, the sum of the lengths of DwPTS and GP is 14 OFDM symbols and the length of DwPTS is less than or equal to 14 OFDM symbols, the length of UpPTS is 0, or when long CP configuration is employed, the sum of the lengths of DwPTS and GP is 12 OFDM symbols and the length of DwPTS is less than or equal to 12 OFDM symbols, the length of UpPTS is 0;

For the other half-frame of 5 ms, SF0 is a downlink service subframe, SF1, SF2 and SF3 are uplink service subframes, and a pair of switch-points is configured for said half-frame, the special time slot field consists of a DwPTS, a GP and an UpPTS, when short CP configuration is employed, the sum of the lengths of DwPTS and GP is 12 OFDM symbols and the length of DwPTS is less than or equal to 9 OFDM symbols, the length of UpPTS is 2 OFDM symbols, or when long CP configuration is employed, the sum of the lengths of DwPTS and GP is 10 OFDM symbols and the length of DwPTS is less than or equal to 8 OFDM symbols, the length of UpPTS is 2 OFDM symbols.

When the ratio of downlink time slot to uplink time slot in the TD-CDMA system is 6:9, in the radio frame of 10 ms of the LTE TDD system:

For one half-frame of 5 ms, SF0 is a downlink service subframe, SF1, SF2 and SF3 are uplink service subframes, and a pair of switch-points is configured for said half-frame, the special time slot field consists of a DwPTS, a GP and an UpPTS, when short CP configuration is employed, the sum of the lengths of DwPTS and GP is 12 OFDM symbols and the length of DwPTS is less than or equal to 9 OFDM symbols, the length of UpPTS is 2 OFDM symbols, or when long CP configuration is employed, the sum of the lengths of DwPTS and GP is 10 OFDM symbols and the length of DwPTS is less than or equal to 8 OFDM symbols, the length of UpPTS is 2 OFDM symbols;

For the other half-frame of 5 ms, SF0 and SF3 are downlink service subframes, SF1 and SF2 are uplink service subframes, and a pair of switch-points is configured for said half-frame, the special time slot field consists of a DwPTS, a GP and an UpPTS, when short CP configuration is employed, the sum of the lengths of DwPTS and GP is 7 OFDM symbols and the length of DwPTS is less than or equal to 4 OFDM symbols, the length of UpPTS is 7 OFDM symbols, or when long CP configuration is employed, the sum of the lengths of DwPTS and GP is 6 OFDM symbols and the length of DwPTS is less than or equal to 4 OFDM symbols, and the length of UpPTS is 6 OFDM symbols.

For the time slot allocation ratio information of the radio frame in the TD-CDMA system, the configuration modes of the special time slot fields of the radio frame in the LTE TDD system are listed in detail in Table 2. Each value in Table 2 represents the number of OFDM symbols.

When the ratio of downlink time slot to uplink time slot of the radio frame in the TD-CDMA system is 10:5, the time offset of the initiation time of the radio frame in the LTE TDD system relative to the initiation time of the radio frame in the TD-CDMA system is 0.

Introductions will be provided for the case that two pairs of switch-points are configured in the radio frame in the TD-CDMA system respectively.

When the ratio of downlink time slot to uplink time slot of the radio frame in the TD-CDMA system is 9:6, the time offset of the initiation time of the radio frame in the LTE TDD system relative to the initiation time of the radio frame in the TD-CDMA system is a delay of ⅓ subframe;

When the ratio of downlink time slot to uplink time slot of the radio frame in the TD-CDMA system is 7:8, the time offset of the initiation time of the radio frame in the LTE TDD system relative to the initiation time of the radio frame in the TD-CDMA system is 0;

When the ratio of downlink time slot to uplink time slot of the radio frame in the TD-CDMA system is 6:9, the time

TABLE 2

| | The configuration of the First special time slot field in the LTE TDD system | | | | The configuration of the Second special time slot field in the LTE TDD system | | | |
|---|---|---|---|---|---|---|---|---|
| | DwPTS + GP | | UpPTS | | DwPTS + GP | | UpPTS | |
| TD-CDMA time slot ratio | Short CP | Long CP | Short CP | Long CP | Short CP | Long CP | Short CP | Long CP |
| 14:1 | 14 (GP = 0) | 12 (GP = 0) | 0 | 0 | 7 (DwPTS ≦ 4) | 6 (DwPTS ≦ 4) | 7 | 6 |
| 13:2 | 14 (GP = 0) | 12 (GP = 0) | 0 | 0 | 12 (DwPTS ≦ 9) | 10 (DwPTS ≦ 8) | 2 | 2 |
| 12:3 | 14 (GP = 0) | 12 (GP = 0) | 0 | 0 | 14 (DwPTS ≦ 14) | 12 (DwPTS ≦ 12) | 0 | 0 |
| 11:4 | 14 (GP = 0) | 12 (GP = 0) | 0 | 0 | 7 (DwPTS ≦ 4) | 6 (DwPTS ≦ 4) | 7 | 6 |
| 10:5 | 14 (GP = 0) | 12 (GP = 0) | 0 | 0 | 12 (DwPTS ≦ 9) | 10 (DwPTS ≦ 8) | 2 | 2 |
| 9:6 | 12 (DwPTS ≦ 9) | 10 (DwPTS ≦ 8) | 2 | 2 | 7 (DwPTS ≦ 4) | 6 (DwPTS ≦ 4) | 7 | 6 |
| 7:8 | 14 (DwPTS ≦ 14) | 12 (DwPTS ≦ 12) | 0 | 0 | 12 (DwPTS ≦ 9) | 10 (DwPTS ≦ 8) | 2 | 2 |
| 6:9 | 12 (DwPTS ≦ 9) | 10 (DwPTS ≦ 8) | 2 | 2 | 7 (DwPTS ≦ 4) | 6 (DwPTS ≦ 4) | 7 | 6 |

For the time slot allocation ratio information of the radio frame in the TD-CDMA system, the time offset of the initiation time of the radio frame in the LTE TDD system relative to the initiation time of the radio frame in the TD-CDMA system is listed in detail in Table 3.

Introductions will be provided for the case that a pair of switch-points is configured in the radio frame of the TD-CDMA system respectively.

When the ratio of downlink time slot to uplink time slot of the radio frame in the TD-CDMA system is 14:1, the time offset of the initiation time of the radio frame in the LTE TDD system relative to the initiation time of the radio frame in the TD-CDMA system is a delay of 3 subframes;

When the ratio of downlink time slot to uplink time slot of the radio frame in the TD-CDMA system is 13:2, the time offset of the initiation time of the radio frame in the LTE TDD system relative to the initiation time of the radio frame in the TD-CDMA system is a delay of 2 subframes;

When the ratio of downlink time slot to uplink time slot of the radio frame in the TD-CDMA system is 12:3, the time offset of the initiation time of the radio frame in the LTE TDD system relative to the initiation time of the radio frame in the TD-CDMA system is a delay of 1 subframe;

When the ratio of downlink time slot to uplink time slot of the radio frame in the TD-CDMA system is 11:4, the time offset of the initiation time of the radio frame in the LTE TDD system relative to the initiation time of the radio frame in the TD-CDMA system is a delay of 1 subframe;

offset of the initiation time of the radio frame in the LTE TDD system relative to the initiation time of the radio frame in the TD-CDMA system is a delay of ⅓ subframe.

TABLE 3

| Time slot Ratio in the TD-CDMA system (Downlink:Uplink) | Relative time offset of the radio frame in the LTE TDD system |
|---|---|
| 14:1 | 3 ms |
| 13:2 | 2 ms |
| 12:3 | 1 ms |
| 11:4 | 1 ms |
| 10:5 | 0 |
| 9:6 | 0.333 ms |
| 7:8 | 0 |
| 6:9 | 0.333 ms |

By the method and apparatus for the coexistence of TDD systems according to the embodiments of the invention, the switch-point of the radio frame in an LTE TDD system and the switch-point of the radio frame in a TD-CDMA system are aligned with each other, the superposition of uplink time slot and downlink time slot in the radio frames in the LTE TDD system and the TD-CDMA system is eliminated, and the inter-system interference is decreased greatly, thereby implementing the coexistence of the LTE TDD system and the TD-CDMA system. Moreover, the embodiments of the invention are not limited to the LTE TDD system and the TD-CDMA system, and the method for the coexistence of TDD systems according to the embodiments of the invention may be employed when the problem of coexistence of two TDD systems with the frame structures the same as those of the LTE TDD system and the TD-CDMA system is to be solved.

Finally, it should be noted that the above embodiments are used for illustrating the technical solutions of the invention only without limitation. Although the invention has been illustrated in detail by referring to preferred embodiments, it should be understood by those skilled in the art that modifications and equivalent substitutions may be made to the technical solutions in the embodiments of the invention without departing from the spirit and scope of the invention.

The invention claimed is:

1. A method for allocating subframes of a Time Division Duplex system, comprising:
   determining a configuration ratio of uplink service subframe to downlink service subframe at a subframe allocation period including at least one radio frame according to a ratio of uplink traffic to downlink traffic, wherein the radio frame structure comprises 2 half-frames each of 5 ms, each half-frame consists of 8 service time slots each of 0.5 ms and 1 special time slot field of 1 ms, and two consecutive service time slots form a subframe of which the length is 1 ms; and
   determining an allocation mode of uplink service subframes and downlink service subframes in the at least one radio frame according to the configuration ratio of uplink service subframe to downlink service subframe;
   wherein, when one radio frame is taken as the subframe allocation period, an allocation mode in which a pair of switch-points is configured for one half-frame of the one radio frame is determined when a base station coverage range required by the system is larger than or equal to a preset first threshold, or an allocation mode in which a pair of switch-points is configured for each half-frame of the one radio frame is determined when a time delay required by the system is less than or equal to a preset second threshold.

2. The method of claim 1, further comprising: broadcasting indication information of the allocation mode of uplink service subframes and downlink service subframes in the at least one radio frame.

3. The method of claim 1, wherein, when one radio frame is taken as the subframe allocation period, the configuration ratio of uplink service subframe to downlink service subframe comprises a ratio of downlink service subframe to uplink service subframe of 2:6,
   in the allocation mode of uplink service subframes and downlink service subframes in the one radio frame determined according to the configuration ratio of 2:6, the first subframe for each half-frame of the radio frame is a downlink service subframe, and the other three subframes are uplink service subframes; and a pair of switch-points is configured for each half-frame.

4. The method of claim 1, wherein, when one radio frame is taken as the subframe allocation period, the configuration ratio of uplink service subframe to downlink service subframe comprises a ratio of downlink service subframe to uplink service subframe of 3:5,
   in the allocation mode of uplink service subframes and downlink service subframes in the one radio frame determined according to the configuration ratio of 3:5, the first subframe for one half-frame of the radio frame is a downlink service subframe, and the other three subframes are uplink service subframes; the first subframe and the fourth subframe in the other half-frame are downlink service subframes, and the other two subframes in the other half-frame are uplink service subframes; and a pair of switch-points is configured for each half-frame.

5. The method of claim 1, wherein, when one radio frame is taken as the subframe allocation period, the configuration ratio of uplink service subframe to downlink service subframe comprises a ratio of downlink service subframe to uplink service subframe of 4:4,
   in the first allocation mode of uplink service subframes and downlink service subframes in the one radio frame determined according to the configuration ratio of 4:4, the first subframe and the fourth subframe for each half-frame of the radio frame are downlink service subframes, and the other two subframes are uplink service subframes; and a pair of switch-points is configured for each half-frame; or
   in the second allocation mode of uplink service subframes and downlink service subframes in the one radio frame determined according to the configuration ratio of 4:4, the first subframe for one half-frame of the radio frame is a downlink service subframe, and the other three subframes are uplink service subframes; the second subframe in the other half-frame is an uplink service subframe, and the other three subframes in the other half-frame are downlink service subframes; and a pair of switch-points is configured for each half-frame.

6. The method of claim 1, wherein, when one radio frame is taken as the subframe allocation period, the configuration ratio of uplink service subframe to downlink service subframe comprises a ratio of downlink service subframe to uplink service subframe of 5:3,
   then in the first allocation mode of uplink service subframes and downlink service subframes in the one radio frame determined according to the configuration ratio of 5:3, four subframes for one half-frame of the radio frame are all downlink service subframes; the first subframe in the other half-frame is a downlink service subframe, and the other three subframes in the other half-frame are uplink service subframes; and a pair of switch-points is configured for each half-frame; or
   in the second allocation mode of uplink service subframes and downlink service subframes in the one radio frame determined according to the configuration ratio of 5:3, the second subframe for one half-frame of the radio frame is an uplink service subframe, and the other three subframes are downlink service subframes; the first subframe and the fourth subframe in the other half-frame are downlink service subframes, and the other two subframes in the other half-frame are uplink service subframes; and a pair of switch-points is configured for each half-frame; or
   in the third allocation mode of uplink service subframes and downlink service subframes in the one radio frame determined according to the configuration ratio of 5:3, four subframes for one half-frame of the radio frame are all downlink service subframes, and no switch-point is configured in said one half-frame; the first subframe in the other half-frame is a downlink service subframe, the other three subframes are uplink service subframes, and a pair of switch-points is configured for said one half-frame.

7. The method of claim 1, wherein, when one radio frame is taken as the subframe allocation period, the configuration ratio of uplink service subframe to downlink service subframe comprises a ratio of downlink service subframe to uplink service subframe of 6:2, in the first allocation mode of uplink service subframes and downlink service subframes in the one radio frame determined according to the configuration ratio of 6:2, four subframes for one half-frame of the radio frame are all downlink service subframes; the first subframe and the fourth subframe in the other half-frame are downlink service subframes, and the other two subframes in the other half-frame are uplink service subframes; and a pair of switch-points is configured for each half-frame; or in the second allocation mode of uplink service subframes and downlink service subframes in the one radio frame determined according to the configuration ratio of 6:2, the second subframe for each half-frame of the radio frame is an uplink service subframe, and the other three subframes are downlink service subframes; and a pair of switch-points is configured for each half-frame; or in the third allocation mode of uplink service subframes and downlink service subframes in the one radio frame determined according to the configuration ratio of 6:2, four subframes for one half-frame of the radio frame are all downlink service subframes, and no switch-point is configured for said half-frame; the first subframe and the fourth subframe in the other half-frame are downlink service subframes, the other two subframes in the other half-frame are uplink service subframes, and a pair of switch-points is configured for said half-frame.

8. The method of claim 1, wherein, when one radio frame is taken as the subframe allocation period, the configuration ratio of uplink service subframe to downlink service subframe comprises a ratio of downlink service subframe to uplink service subframe of 7:1, in the first allocation mode of uplink service subframes and downlink service subframes in the one radio frame determined according to the configuration ratio of 7:1, four subframes for one half-frame of the radio frame are all downlink service subframes; the second subframe in the other half-frame is an uplink service subframe, and the other three subframes in the other half-frame are downlink service subframes; and a pair of switch-points is configured for each half-frame; or in the second allocation mode of uplink service subframes and downlink service subframes in the one radio frame determined according to the configuration ratio of 7:1, four subframes for one half-frame of the radio frame are all downlink service subframes, and no switch-point is configured for said half-frame; the second subframe in the other half-frame is an uplink service subframe, the other three subframes in the other half-frame are downlink service subframes, and a pair of switch-points is configured for said half-frame.

9. The method of claim 1, wherein, when one radio frame is taken as the subframe allocation period, the configuration ratio of uplink service subframe to downlink service subframe comprises a ratio of downlink service subframe of uplink service subframe of 8:0, in the first allocation mode of uplink service subframes and downlink service subframes in the one radio frame determined according to the configuration ratio of 8:0, four subframes for each half-frame of the radio frame are all downlink service subframes; and a pair of switch-points is configured for each half-frame; or in the second allocation mode of uplink service subframes and downlink service subframes in the one radio frame determined according to the configuration ratio of 8:0, four subframes for each half-frame of the radio frame are all downlink service subframes; and a pair of switch-points is configured for one half-frame thereof; or in the third allocation mode of uplink service subframes and downlink service subframes in the one radio frame determined according to the configuration ratio of 8:0, four subframes for each half-frame of the radio frame are all downlink service subframes, and no switch-point is configured for each half-frame.

10. The method of claim 1, wherein, when a pair of switch-points is configured for one half-frame of the radio frame, the special time slot field for said half-frame consists of a DwPTS, a downlink-to-uplink GP and an UpPTS; and when no switch-point is configured for one half-frame of the radio frame, the special time slot field consists of a DwPTS and is complete downlink transmission.

11. The method of claim 1, wherein, the ratio of uplink traffic to downlink traffic is updated according to uplink traffic and downlink traffic measured periodically.

12. A subframe allocation apparatus of a Time Division Duplex system, comprising:
a configuration ratio determination unit, adapted to determine a configuration ratio of uplink service subframe to downlink service subframe at a subframe allocation period including at least one radio frame according to a ratio of uplink traffic to downlink traffic, wherein the radio frame structure comprises 2 half-frames each of 5 ms, each half-frame consists of 8 service time slots each of 0.5 ms and 1 special time slot field of 1 ms, and two consecutive service time slots form a subframe of which the length is 1 ms; and
a first allocation mode determination unit, adapted to determine an allocation mode of uplink service subframes and downlink service subframes in the at least one radio frame according to the configuration ratio of uplink service subframe to downlink service subframe;
wherein, when one radio frame is taken as the subframe allocation period, an allocation mode in which a pair of switch-points is configured for one half-frame of the one radio frame is determined when a base station coverage range required by the system is larger than or equal to a preset first threshold, or an allocation mode in which a pair of switch-points is configured for each half-frame of the one radio frame is determined when a time delay required by the system is less than or equal to a preset second threshold.

13. The apparatus of claim 12, further comprising:
an indication information transmission unit, adapted to broadcast indication information of the allocation mode of uplink service subframes and downlink service subframes in the at least one radio frame.

14. A subframe allocation apparatus of a Time Division Duplex system, comprising:
an indication information receiving unit, adapted to receive indication information of an allocation mode of uplink service subframes and downlink service subframes in at least one radio frame when said at least one radio frame is taken as a subframe allocation period, wherein the radio frame structure comprises 2 half-frames each of 5 ms, each half-frame consists of 8 service time slots each of 0.5 ms and 1 special time slot field of 1 ms, and two consecutive service time slots form a subframe of which the length is 1 ms;
a second allocation mode determination unit, adapted to determine the allocation mode of uplink service subframes and downlink service subframes in said at least one radio frame according to the indication information; and a subframe allocation unit, adapted to determine the uplink service subframes and the downlink service subframes in said at least one radio frame according to the allocation mode;

wherein, when one radio frame is taken as the subframe allocation period, an allocation mode in which a pair of switch-points is configured for one half-frame of the one radio frame is determined when a base station coverage range required by the system is larger than or equal to a preset first threshold, or an allocation mode in which a pair of switch-points is configured for each half-frame of the one radio frame is determined when a time delay required by the system is less than or equal to a preset second threshold.

* * * * *